United States Patent
Liu et al.

(10) Patent No.: US 12,415,544 B2
(45) Date of Patent: Sep. 16, 2025

(54) SYSTEM AND METHOD FOR SIMULATING AUTONOMOUS VEHICLE TESTING ENVIRONMENTS

(71) Applicant: The Regents of the University of Michigan, Ann Arbor, MI (US)

(72) Inventors: Xianghong Liu, Ann Arbor, MI (US);
Shuo Feng, Ann Arbor, MI (US);
Haowei Sun, Ann Arbor, MI (US);
Xintao Yan, Ann Arbor, MI (US);
Haojie Zhu, Ann Arbor, MI (US);
Zhengxia Zou, Ann Arbor, MI (US);
Shengyin Shen, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 249 days.

(21) Appl. No.: 18/143,475

(22) Filed: May 4, 2023

(65) Prior Publication Data
US 2023/0358640 A1    Nov. 9, 2023

Related U.S. Application Data

(60) Provisional application No. 63/338,424, filed on May 4, 2022.

(51) Int. Cl.
*B60W 60/00* (2020.01)
*G06N 3/08* (2023.01)

(52) U.S. Cl.
CPC ........... *B60W 60/0015* (2020.02); *G06N 3/08* (2013.01)

(58) Field of Classification Search
None
See application file for complete search history.

(56) References Cited

U.S. PATENT DOCUMENTS

| | | | |
|---|---|---|---|
| 9,645,577 B1 * | 5/2017 | Frazzoli | B60W 30/18163 |
| 11,158,002 B1 * | 10/2021 | Brandmaier | G07C 5/008 |
| 11,767,030 B1 * | 9/2023 | Bagschik | B60W 60/0015 701/23 |
| 2018/0357409 A1 * | 12/2018 | Jantz | G06F 21/44 |
| 2019/0100216 A1 * | 4/2019 | Volos | G06Q 40/08 |
| 2019/0213103 A1 * | 7/2019 | Morley | G06F 11/3692 |
| 2019/0295179 A1 * | 9/2019 | Shalev-Shwartz | B60W 10/18 |
| 2020/0033868 A1 | 1/2020 | Palanisamy et al. | |
| 2020/0065443 A1 | 2/2020 | Liu et al. | |

(Continued)

OTHER PUBLICATIONS

Lecun, Y., Bengio, Y., & Hinton, G. (2015). Deep learning. nature, 521(7553), 436-444.

(Continued)

*Primary Examiner* — Ryan Rink
(74) *Attorney, Agent, or Firm* — Reising Ethington P.C.

(57) ABSTRACT

A system and method for safety testing a host autonomous vehicle (AV). This method includes: generating a trained machine learning (ML) agent and testing the host AV in an environment that includes one or more background vehicles configured to operate according to the trained ML agent. The ML agent is generated by: (i) obtaining a testing state model having non-safety-critical states and safety-critical states, (ii) editing the testing state model to obtain an edited testing state model that omits data concerning the non-safety-critical states, and (iii) training a ML agent using the edited state testing model so as to generate the trained ML agent.

20 Claims, 22 Drawing Sheets

(56) References Cited

U.S. PATENT DOCUMENTS

| | | | |
|---|---|---|---|
| 2020/0089244 A1 | 3/2020 | Zhang et al. | |
| 2020/0089247 A1* | 3/2020 | Shkurti | G05D 1/0257 |
| 2021/0303877 A1* | 9/2021 | Jain | G06V 20/20 |
| 2023/0182754 A1* | 6/2023 | Dong | B60W 40/02 701/26 |
| 2023/0331256 A1* | 10/2023 | Collin | B60W 60/0016 |
| 2024/0134386 A1* | 4/2024 | Nag | G05D 1/617 |

OTHER PUBLICATIONS

Insider, 10 million self-driving cars will be on the road by 2020, https://www.businessinsider.com/report-10-million-self-driving-cars-will-be-on-the-road-by-2020-2015-5-6, 2016.

Nissan promises self-driving cars by 2020, https://www.wired.com/2013/08/nissan-autonomous-drive/, 2014.

Insider, Tesla's self-driving vehicles are not for off, https://www.businessinsider.com/elon-musk-on-teslas-autonomous-cars-2015-9, 2015.

Society of Automotive Engineers, Taxonomy and Definitions for Terms Related to Driving Automation Systems for On-Road Motor Vehicles, https://www.sae.org/standards/content/j3016_202104/, 2021.

Kalra, N., & Paddock, S. M. (2016). Driving to safety: How many miles of driving would it take to demonstrate autonomous vehicle reliability ?. Transportation Research Part A: Policy and Practice, 94, 182-193.

California Department of Moter Vehicles, Disengagement reports, https://www.dmv.ca.gov/portal/vehicle-industry-services/autonomous-vehicles/disengagement-reports/, 2020.

Paz, D., Lai, P. J., Chan, N., Jiang, Y., & Christensen, H. I. (2020, September). Autonomous vehicle benchmarking using unbiased metrics. In 2020 IEEE/RSJ International Conference on Intelligent Robots and Systems (IROS) (pp. 6223-6228). IEEE.

Favarò, F., Eurich, S., & Nader, N. (2018). Autonomous vehicles' disengagements: Trends, triggers, and regulatory limitations. Accident Analysis & Prevention, 110, 136-148.

Donoho, D. L. (2000). High-dimensional data analysis: The curses and blessings of dimensionality. AMS math challenges lecture, 1(2000), 33 pages.

Sutton, R. S., & Barto, A. G. (2018). Reinforcement learning: An introduction. MIT press.

Megahed, F. M., Chen, Y. J., Megahed, A., Ong, Y., Altman, N., & Krzywinski, M. (2021). The class imbalance problem. Nature Methods, 18(11), 1270-1272.

Hinton, G. E., & Salakhutdinov, R. R. (2006). Reducing the dimensionality of data with neural networks. science, 313 (5786), 504-507.

Silver, D., Schrittwieser, J., Simonyan, K., Antonoglou, I., Huang, A., Guez, A., . . . & Hassabis, D. (2017). Mastering the game of go without human knowledge. nature, 550(7676), 354-359.

Mirhoseini, A., Goldie, A., Yazgan, M., Jiang, J. W., Songhori, E., Wang, S., . . . & Dean, J. (2021). A graph placement methodology for fast chip design. Nature, 594(7862), 207-212.

Koren, M., Alsaif, S., Lee, R., & Kochenderfer, M. J. (Jun. 2018). Adaptive stress testing for autonomous vehicles. In 2018 IEEE Intelligent Vehicles Symposium (IV) (pp. 1-7). IEEE.

Pek, C., Manzinger, S., Koschi, M., & Althoff, M. (2020). Using online verification to prevent autonomous vehicles from causing accidents. Nature Machine Intelligence, 2(9), 518-528.

Katz, G., Barrett, C., Dill, D. L., Julian, K., & Kochenderfer, M. J. (Jul. 2017). Reluplex: An efficient SMT solver for verifying deep neural networks. In International Conference on Computer Aided Verification (pp. 97-117). Springer, Cham.

Feng, S., Feng, Y., Yu, C., Zhang, Y., H.X. Liu. (2020). Testing scenario library generation for connected and automated vehicles, Part I: Methodology. IEEE Transactions on Intelligent Transportation Systems, 22(3), 1573-1582.

Feng, S., Y. Feng, H. Sun, S. Bao, Y. Zhang, H.X. Liu. (2020). Testing scenario library generation for connected and automated vehicles, Part II: Case studies. IEEE Transactions on Intelligent Transportation Systems, 22(9), 5635-5647.

Feng, S., Feng, Y., Sun, H., Zhang, Y., & Liu, H. X. (2020). Testing scenario library generation for connected and automated vehicles: an adaptive framework. IEEE Transactions on Intelligent Transportation Systems, 23(2), 1213-1222.

Feng, S., Yan, X., Sun, H., Feng, Y., & Liu, H. X. (2021). Intelligent driving intelligence test for autonomous vehicles with naturalistic and adversarial environment. Nature communications, 12(1), 1-14.

Sinha, A., O'Kelly, M., Tedrake, R., & Duchi, J. C. (2020). Neural bridge sampling for evaluating safety-critical autonomous systems. Advances in Neural Information Processing Systems, 33.

Li, L. et al. Parallel testing of vehicle intelligence via virtual-real interaction. Sci. Robot. 4, eaaw4106 (2019).

Li, L., Zheng, N., & Wang, F. Y. (2020). A theoretical foundation of intelligence testing and its application for intelligent vehicles. IEEE Transactions on Intelligent Transportation Systems, vol. 22, issue 10, 6297-6306.

Simulation City: Introducing Waymo's most advanced simulation system yet for autonomous driving. https://blog.waymo.com/2021/06/SimulationCity.html.

S. Kato, S. Tokunaga, Y. Maruyama, S. Maeda, M. Hirabayashi, Y. Kitsukawa, A. Monrroy, T. Ando, Y. Fujii, and T. Azumi,"Autoware on Board: Enabling Autonomous Vehicles with Embedded Systems," In Proceedings of the 9th ACM/IEEE International Conference on Cyber-Physical Systems (ICCPS2018), pp. 287-296, 2018.

Feng, S., Feng, Y., Yan, X., Shen, S., Xu, S., & Liu, H. X. (2020). Safety assessment of highly automated driving systems in test tracks: a new framework. Accident Analysis & Prevention, 144, 105664.

Lopez, P. A., Behrisch, M., Bieker-Walz, L., Erdmann, J., Flötteröd, Y. P., Hilbrich, R., . . . & Wießner, E. (Nov. 2018). Microscopic traffic simulation using sumo. In 2018 21st International Conference on Intelligent Transportation Systems (ITSC) (pp. 2575-2582). IEEE.

D. Bezzina, J. Sayer, Safety pilot model deployment: Test conductor team report. (Report No. DOT HS 812 171). Washington, DC: National Highway Traffic Safety Administration (2014).

J. Sayer, D. LeBlanc, S. Bogard, D. Funkhouser, S. Bao, M.L. Buonarosa, A. Blankespoor, Integrated Vehicle-Based Safety Systems Field Operational Test: Final Program Report (No. FHWA-JPO-11-150; UMTRI-2010-36). United States. Joint Program Office for Intelligent Transportation Systems (2011).

Arun, A., Haque, M. M., Bhaskar, A., Washington, S., & Sayed, T. (2021). A systematic mapping review of surrogate safety assessment using traffic conflict techniques. Accident Analysis & Prevention, 153, 106016.

Weng, B., Rao, S. J., Deosthale, E., Schnelle, S., & Barickman, F. (Jun. 2020). Model predictive instantaneous safety metric for evaluation of automated driving systems. In 2020 IEEE Intelligent Vehicles Symposium (IV) (pp. 1899-1906). IEEE.

Junietz, P., Bonakdar, F., Klamann, B., & Winner, H. (Nov. 2018). Criticality metric for the safety validation of automated driving using model predictive trajectory optimization. In 2018 21st International Conference on Intelligent Transportation Systems (ITSC) (pp. 60-65). IEEE.

Sun, H., Feng, S., Yan, X., & Liu, H. X. (2021). Corner Case Generation and Analysis for Safety Assessment of Autonomous Vehicles. Transportation Research Record. DOI: 10.1177/03611981211018697.

Schulman, J., Wolski, F., Dhariwal, P., Radford, A., & Klimov, O. (2017). Proximal policy optimization algorithms. https://arxiv.org/abs/1707.06347.

Owen, A. B. Monte Carlo Theory, Methods and Examples. https://statweb.stanford.edu/~owen/mc/ (2013).

Liang, E et al. RLlib: Abstractions for Distributed Reinforcement Learning. (2018). https://arxiv.org/abs/1712.09381.

Treiber, M., Hennecke, A. & Helbing, D. Congested traffic states in empirical observations and microscopic simulations. Phys. Rev. E 62, 1805 (2000).

Kesting, A., Treiber, M. & Helbing, D. General lane-changing model MOBIL for car-following models. Transport. Res. Rec. 1999, 86-94 (2007).

(56) References Cited

OTHER PUBLICATIONS

Huang, G., Liu, Z., Van Der Maaten, L., & Weinberger, K. Q. (2017). Densely connected convolutional networks. In Proceedings of the IEEE conference on computer vision and pattern recognition (pp. 4700-4708).
Bengio, Y., Louradour, J., Collobert, R., & Weston, J. (Jun. 2009). Curriculum learning. In Proceedings of the 26th annual international conference on machine learning (pp. 41-48).
Au, S. K., & Beck, J. L. (2003). Important sampling in high dimensions. Structural safety, 25(2), 139-163.
Silver, D., Singh, S., Precup, D., & Sutton, R. S. (2021). Reward is enough. Artificial Intelligence, 103535.
Yan, X., Feng, S., Sun, H., & Liu, H. X. (2021). Distributionally Consistent Simulation of Naturalistic Driving Environment for Autonomous Vehicle Testing. https://arxiv.org/abs/2101.02828.
Chang AX, Funkhouser T, Guibas L, Hanrahan P, Huang Q, Li Z, Savarese S, Savva M, Song S, Su H, Xiao J. Shapenet: An information-rich 3d model repository. arXiv preprint arXiv:1512.03012. Dec. 9, 2015.
Darweesh, H., Takeuchi, E., Takeda, K., Ninomiya, Y., Sujiwo, A., Morales, L. Y., . . . & Kato, S. (2017). Open source integrated planner for autonomous navigation in highly dynamic environments. Journal of Robotics and Mechatronics, 29(4), 668-684.
Written Opinion and Search report corresponding to application PCT/US2023/021043, dated Aug. 24, 2023, 7 pages.
Schick, Modeling of specific safety-critical driving scenarios for data synthesis in the context of autonomous driving software, Aug. 6, 2020, 12 pages.
Mitchell et al., Multi-Vehicle Mixed Reality Reinforcement Learning for Autonomous Multi-Lane Driving, dated Feb. 10, 2020, 10 pages.

* cited by examiner

SYSTEM AND METHOD FOR SIMULATING AUTONOMOUS VEHICLE TESTING ENVIRONMENTS

STATEMENT REGARDING FEDERALLY SPONSORED RESEARCH/DEVELOPMENT

This invention was made with government support under 69A3551747105 awarded by the U.S. Department of Transportation. The government has certain rights in the invention.

TECHNICAL FIELD

This disclosure relates to systems and methods for simulating an environment for testing autonomous vehicles.

BACKGROUND

The rapid development of autonomous vehicle (AV) technologies is contributing to a new revolution in transportation on a scale not seen since the introduction of automobiles a century ago. AV technology has the potential to significantly improve transportation safety, mobility, and sustainability, thereby attracting worldwide attention from various industries, government agencies, professional organizations, and academic institutions. In the past twenty years, significant progress has been made on the development of AVs, particularly with the emergence of deep learning (1). Around 2015, a number of companies had announced that there would be mass production of AVs around 2020 (2-4). So far, the reality has not lived up to expectations, and no Level 4 AVs (5) are commercially available.

The reason for this is multifold. But above all, the safety performance of AVs is still below that of human drivers, at least for certain scenarios. For average drivers in the United States, the occurrence probability of an accident is around $1.9 \times 10^{-6}$ per mile in the naturalistic driving environment (NDE) (6). In contrast, the disengagement rate for the state-of-the-art AV is around $3.3 \times 10^{-5}$ per mile, according to the 2020 Disengagement Report from California (7). As the disengagement rate can represent the safety performance to a certain extent (8, 9), it indicates that the gap in safety performance is still more than one order of magnitude.

One critical bottleneck to improving the AV safety performance is the severe inefficiency of validating safety performance. Prevailing approaches usually test AVs in the NDE through a combination of software simulation, closed test track(s), and on-road testing. For example, U.S. Patent Application Publication No. 2020/0065443 teaches a simulation system that may be used for testing real AVs in a real environment, but augmented with simulated vehicles. Real traffic information and state information of the real AV(s) may be received, such as at a roadside unit, and then sent to the computer system running the simulation. The system, thus, coordinates the states and positioning of the real world with those simulated objects, such as simulated vehicles, in the simulation. Such a system is useful for testing vehicles using simulated elements, such as simulated background vehicles.

However, to validate the safety performance of AVs at the level of human drivers, hundreds of millions of miles, and sometimes hundreds of billions of miles, would be required to test in the NDE (6). It is inefficient even under aggressive simulation schemes; for example, Waymo™ has only simulated 20 billion miles in total over the years, which is the world's longest simulation test. Due to this severe inefficiency, AV developers must pay significant economic and time costs to evaluate each new development before they can further improve or deploy it, which has severely hindered the progress of AV development and deployment.

In essence, validating the safety performance of AVs is a rare event estimation problem in a high-dimensional space. The main challenge is caused by the compounding effects of "curse of rarity" on top of "curse of dimensionality," as shown in FIGS. 1-2. By "curse of dimensionality," it is meant that driving environments could be spatiotemporally complex and the variables needed to define such environments are of a high dimensionality. As the volume of the variable space grows exponentially with dimensionality, the computational complexity of many optimization and estimation algorithms could also grow exponentially (10). By "curse of rarity," it is meant that the occurrence probability for the safety-critical events is rare, i.e., most points of the variable space are non-safety-critical, which provide do not provide beneficial information for such training. Under such circumstances, it is hard for a deep learning model to learn even given a sufficient amount of data, as the precious information of safety-critical events could be buried under the large amount of non-safety-critical data. For example, the policy gradient estimation that is widely applied in deep reinforcement learning (DRL) approaches (11) can suffer from too much variance, thereby misleading the training process from the very beginning. It can also cause severe imbalanced data issues with a much greater imbalanced ratio than typical imbalance problems (12). The compounding effects of "curse of rarity" on top of "curse of dimensionality," i.e., the rarity of safety-critical events in a high-dimensional space, make the issues even worse.

The past decades have witnessed rapid progress in the ability of artificial intelligence (AI) systems for solving problems with the "curse of dimensionality" (13), for example, Go has a state space of $10^{360}$ (14) and the chip design could have a state space of the order of $10^{2500}$ (15), as shown in FIG. 2. Prior to this work, however, solving the "curse of dimensionality" and the "curse of rarity" simultaneously remains an open question, which hinders the applicability of AI techniques for validating the safety performance of AVs in complex environments. Consequently, all prior approaches, falsification (16), verification (17, 18), and scenario testing (19-25), can only be applied to spatiotemporally limited scenario segments of driving environments to evaluate isolated events, such as whether AVs can successfully make an unprotected left turn. Although these scenario segments are beneficial for evaluating isolated skills, it may be more critical to evaluate the systematic safety performance of AVs driving continuously in the entire operational design domain, such as the safety performance over full-length trips (26). For example, an AV driving in a highway environment for an extended period could interact with many vehicles and other road users (each with different behavioral characteristics) under different weather and lighting conditions, involving various maneuvers such as car-following, lane-changing, over-taking, merging, etc. Such testing is referred to herein as "naturalistic safety testing," which refers to the fact that such testing is not geared toward evaluating predetermined, isolated safety-critical events.

SUMMARY

In accordance with an aspect of the invention, there is provided a method of safety testing a host AV. This method includes: generating a trained machine learning (ML) agent and testing the host AV in an environment that includes the one or more background vehicles configured to operate according to the trained ML agent. The ML agent is generated by: (i) obtaining a testing state model having non-safety-critical states and safety-critical states, (ii) editing the testing state model to obtain an edited testing state model that omits data concerning the non-safety-critical states, and (iii) training a ML agent using the edited state testing model so as to generate the trained ML agent.

The method may further include any of the following features or any technically-feasible combination of two or more of the following features:

further comprising a step of configuring the one or more background vehicles to operate according to the trained ML agent, wherein the configuring step includes storing data representing the trained ML agent in computer-readable memory;

the trained ML agent is a deep reinforcement learning (DRL) agent, and wherein the trained ML agent employs a neural network;

the trained ML agent is a dense DRL (D2RL) agent;

the testing state model is or is based on a Markov decision process (MDP);

a D2RL approach is used to densify safety-critical data used to train the ML agent;

the editing sub-step includes removing the non-safety-critical states and reconnecting the safety-critical states;

the environment in which the host AV is tested is a real environment having one or more roadways on which the host AV travels during testing, and wherein the one or more background vehicles are virtual or simulated vehicles;

the testing step includes carrying out a simulation that is synchronized with the host AV and the environment in which the host AV is tested, and wherein the simulation includes at least one of the one or more background vehicles as a virtual background vehicle; and/or the method is carried out by an augmented reality (AR) autonomous vehicle (AV) testing system.

In accordance with another aspect of the invention, there is provided an autonomous vehicle (AV) testing system. This AV testing system includes: at least one electronic processor and memory accessible by the at least one electronic processor, wherein the memory stores computer instructions. The AV testing system is configured so that, when the at least one electronic processor executes the computer instructions, the AV testing system: generates a trained machine learning (ML) agent and tests the host AV in an environment that includes the one or more background vehicles configured to operate according to the trained ML agent. The ML agent is generated by: (i) obtaining a testing state model having non-safety-critical states and safety-critical states, (ii) editing the testing state model to obtain an edited testing state model that omits data concerning the non-safety-critical states, and (iii) training a ML agent using the edited state testing model so as to generate the trained ML agent.

The AV testing system may further include any of the following features or any technically-feasible combination of two or more of the following features:

the AV testing system is configured so that, when the at least one electronic processor executes the computer instructions, the AV testing system: configures the one or more background vehicles to operate according to the trained ML agent, wherein the configuring step includes storing data representing the trained ML agent in computer-readable memory;

the trained ML agent is a deep reinforcement learning (DRL) agent, and wherein the trained ML agent employs a neural network;

the trained ML agent is a dense DRL (D2RL) agent;

the testing state model is or is based on a Markov decision process (MDP);

a D2RL approach is used to densify safety-critical data used to train the ML agent;

the editing sub-step includes removing the non-safety-critical states and reconnecting the safety-critical states;

the environment in which the host AV is tested is a real environment having one or more roadways on which the host AV travels during testing, and wherein the one or more background vehicles are virtual or simulated vehicles; and/or the testing step includes carrying out a simulation that is synchronized with the host AV and the environment in which the host AV is tested, and wherein the simulation includes at least one of the one or more background vehicles as a virtual background vehicle.

In accordance with yet another aspect of the invention, there is provided a method of safety testing a host AV. This method includes: generating a trained dense deep reinforcement learning (D2RL) agent; configuring one or more background vehicles to operate according to the trained D2RL agent; and after configuring one or more background vehicles to operate according to the trained D2RL agent, testing the AV in an environment that includes the one or more background vehicles. The D2RL agent is generated by (i) obtaining a testing state model having non-safety-critical states and safety-critical states, (ii) editing the testing state model to omit at least one non-safety-critical state and reconnect at least two safety-critical states, and (iii) training a D2RL agent using the edited state testing model so as to generate the trained D2RL agent.

BRIEF DESCRIPTION OF DRAWINGS

Illustrative embodiments will hereinafter be described in conjunction with the appended drawings, wherein:

FIG. 4A shows an exemplary episode where there are no critical states, FIG. 4B shows an exemplary episode where there are critical states and no accident, and FIG. 4C shows an exemplary episode where there are critical states separated by uncritical states and an accident;

DETAILED DESCRIPTION

Figure 1:
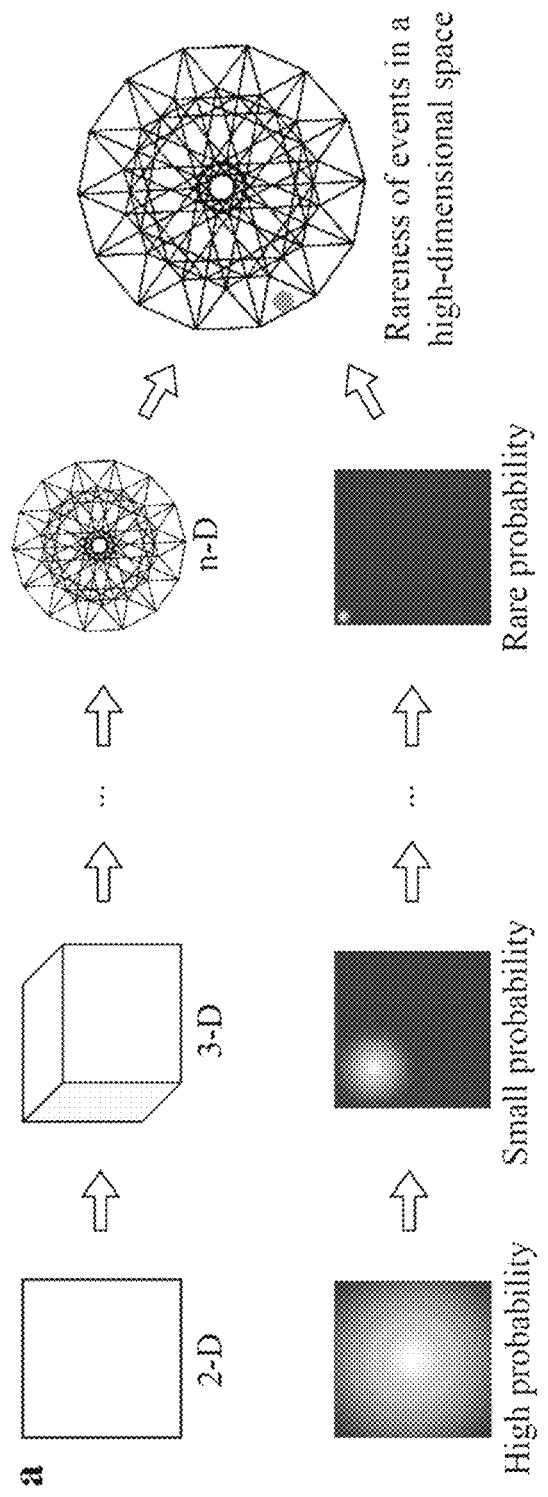
FIG. 1 is a diagrammatic illustration of the concepts of the curse of dimensionality and the curse of rarity.
Figure 2:
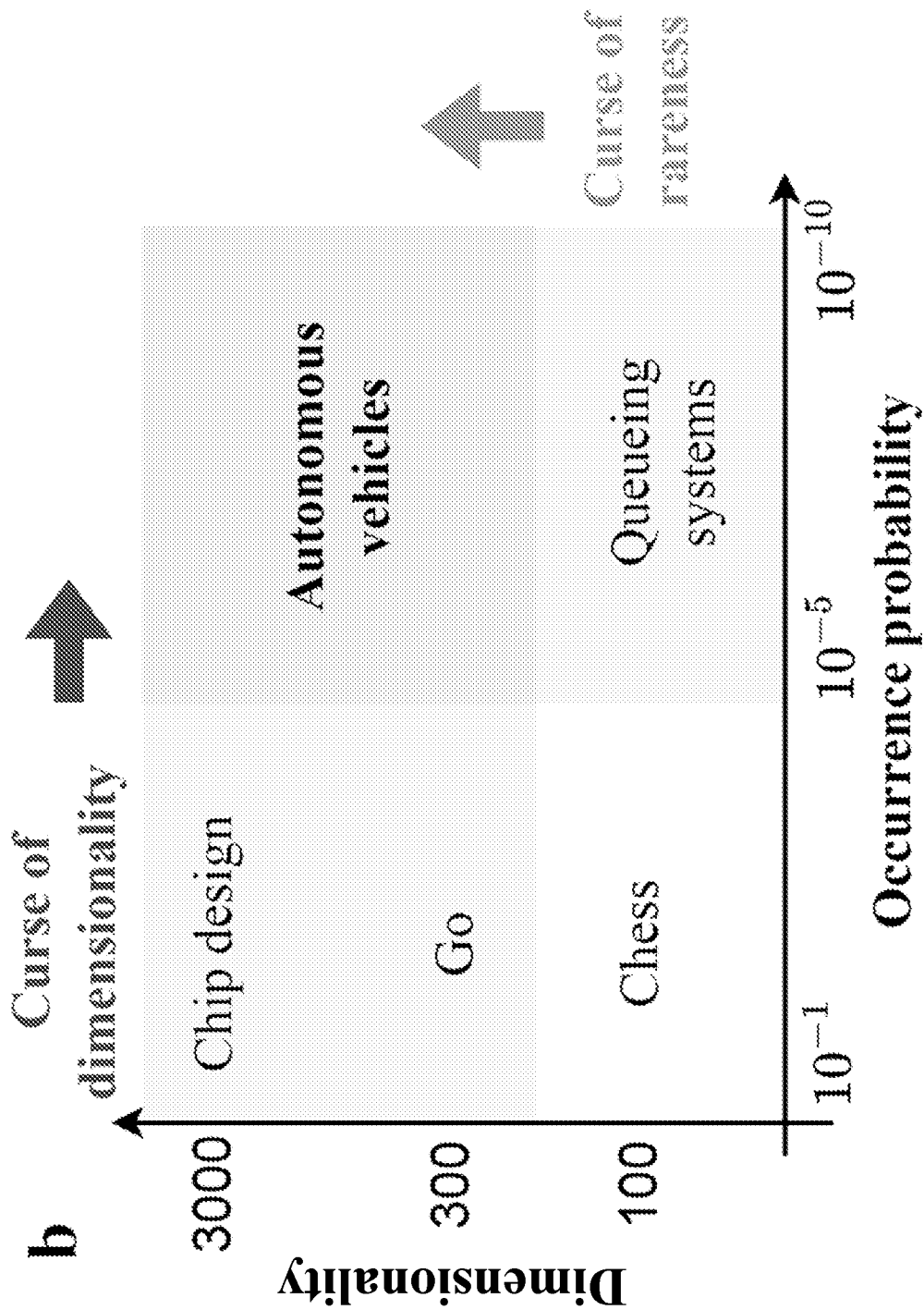
FIG. 2 is a graph illustrating compounding effects of the curse of dimensionality and the curse of rarity as they relate to autonomous vehicles.

The system and method described herein enables providing a simulation for autonomous vehicle (AV) testing of a host AV that includes introducing a safety-critical event for purposes of evaluating or testing AV performance or behavior in response to the introduced safety-critical event. As discussed above, the "curse of dimensionality" and the "curse of rarity" make it particularly difficult to perform accurate, naturalistic testing on safety-critical events for AVs without having to expend a high amount of resources. The disclosed system and method can be used to provide a simulation having virtual background vehicles that are directed to operate according to a machine learning (ML) agent, such as a dense deep reinforcement learning (D2RL) agent, that results in introducing safety-critical events into the testing environment as a part of naturalistic safety testing of the host AV at a rate that is much higher than that when the disclosed method is not used—i.e., the ratio of safety-critical events to non-safety-critical events is much higher (i.e., at least 2 times) using the disclosed system and method compared with conventional systems.

A "safety-critical event" may be defined for the particular application in which the system and method are used, but generally, and without limitation, a "safety-critical event" for a host AV refers to an event that threatens safety of one or more passengers of the host AV, and the term "non-safety-critical events" refers to events that are not "safety-critical events." Examples of a safety-critical event for the host AV are another vehicle cutting closely in front of the host AV or another vehicle braking hard when in front of the host AV. Such maneuvers giving rise to a safety-critical event are referred to herein as adversarial maneuvers. The term "host AV" refers to the AV that is being tested or to be tested using the simulation. The term "background vehicle" or "BV" refers to other vehicles, which may be virtual vehicles that are introduced into the simulation or may be real vehicles, such as real AVs, that are present at a testing facility along with the host AV.

As mentioned above, achieving human-level safety performance for autonomous vehicles remains a challenge. One major bottleneck is the prohibitively high cost that is needed to validate autonomous vehicle safety in a naturalistic driving environment (NDE), because of the rarity of safety-critical events in a high dimensional space, i.e., the "curse of rarity." That is, it remains difficult to test AVs for safety-critical event handling as a part of naturalistic safety testing, which is akin to more holistic testing compared with isolated AV testing that is designed for testing individual test cases. It is difficult for a deep learning model to learn even given a sufficient amount of data, as the precious information of safety-critical events are oftentimes buried under a large amount of non-safety-critical data or non-safety-critical events. That is, the ratio of information of safety-critical events to the information of non-safety-critical events is very low; however, as a result of the system and method provided herein, this ratio is drastically increased (by a factor of at least 100 in at least some embodiments) so as to overcome the curse of rarity and curse of dimensionality. In some embodiments and implementations, this safety-critical data to non-safety-critical data ratio (or "safety-critical ratio") could be increased even higher.

At least according to some embodiments, the system and method provided herein addresses this challenge by implementing a dense deep reinforcement learning (D2RL) approach in which a Markov decision process (MDP) is edited by removing uncritical states and reconnecting critical states to one another so that the use of the information in the training data is densified. Using the disclosed D2RL approach, according to at least one embodiment, background vehicles (BVs) are trained in the naturalistic driving environment simulator to learn when to execute a particular adversarial maneuver, resulting in an intelligent testing environment that can maximize the evaluation efficiency while ensuring the estimation unbiasedness. According to at least some embodiments, the D2RL approach can scale to spatiotemporally complex driving environments that prior approaches cannot handle. The effectiveness of this D2RL approach (the "disclosed D2RL approach") was evaluated by testing a Level 4 AV in a physical highway test track over full-length trips. Compared with testing in a NDE, the disclosed D2RL approach accelerates the evaluation process by multiple orders of magnitude, at least according to some embodiments and implementations.

Figure 3:
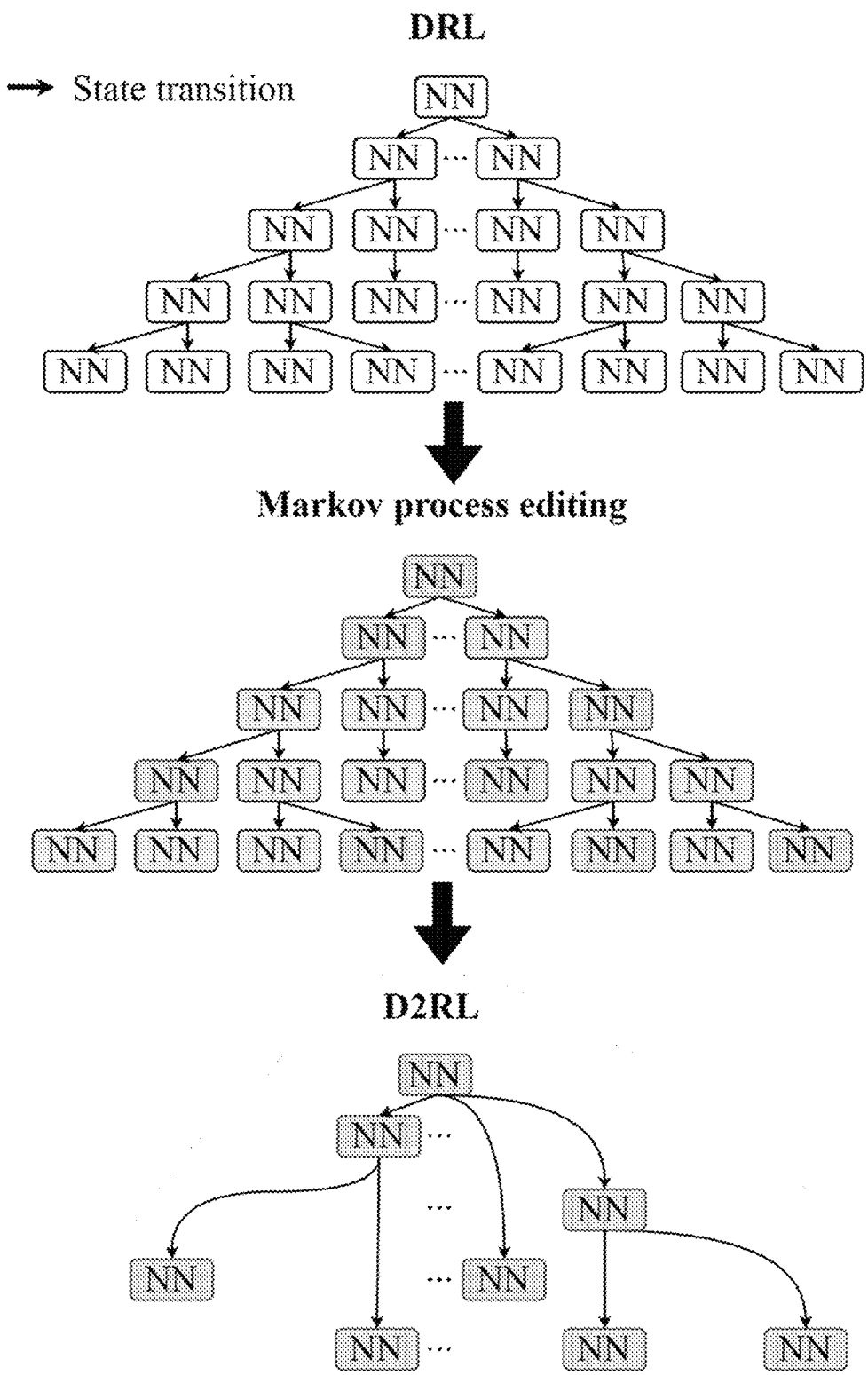
FIG. 3 depicts an exemplary DRL editing process that is used to obtain an edited Markov decision process representation in which uncritical states are removed and critical states are reconnected, and wherein the edited Markov decision process representation is used for training neural networks to generate a machine learning (ML) agent.

In at least some embodiments, the disclosed D2RL approach uses dense learning to identify and remove non-safety-critical data so that the neural networks are trained utilizing only the safety-critical data or at least data that is more dense in terms of safety-critical data (i.e., the safety-critical ratio is higher). As only a very small portion of data is safety-critical, at least in some embodiments or implementations, the information of the remaining data will be significantly densified, which overcomes the "curse of rarity," thereby enabling the application of deep learning techniques. Specifically, the disclosed D2RL approach includes editing a Markov decision process by removing uncritical (or non-safety-critical) states and reconnecting critical (or safety-critical) states to one another, and then training neural networks using the edited Markov process, as shown in FIG. 3. The disclosed D2RL approach may dramatically reduce the variance of the policy gradient estimation with multiple orders of magnitude without loss of unbiasedness, compared with the DRL approach, as shown in Theorem 1 below. Such significant variance reduction may enable neural networks to learn for safety-critical autonomous systems and achieve tasks that are intractable for the DRL approach. With the disclosed D2RL approach, the background vehicles or other road users are trained through a neural network to learn when to execute what adversarial maneuvers, which aims to maximize the testing efficiency and ensure testing accuracy. At least according to some embodiments and implementations, use of this approach results in an intelligent testing environment that may reduce the required testing miles of AVs by multiple orders of magnitude while ensuring the testing is unbiased, compared with a naturalistic driving environment (NDE). Therefore, at least according to some embodiments, the disclosed D2RL approach significantly accelerates the evaluation process of AVs, which may further shorten the development cycle of AVs and it also opens the door for leveraging advances in artificial intelligence (AI) techniques for validating AI performance, i.e., AI tests AI (FIG. 4).

Figure 5:
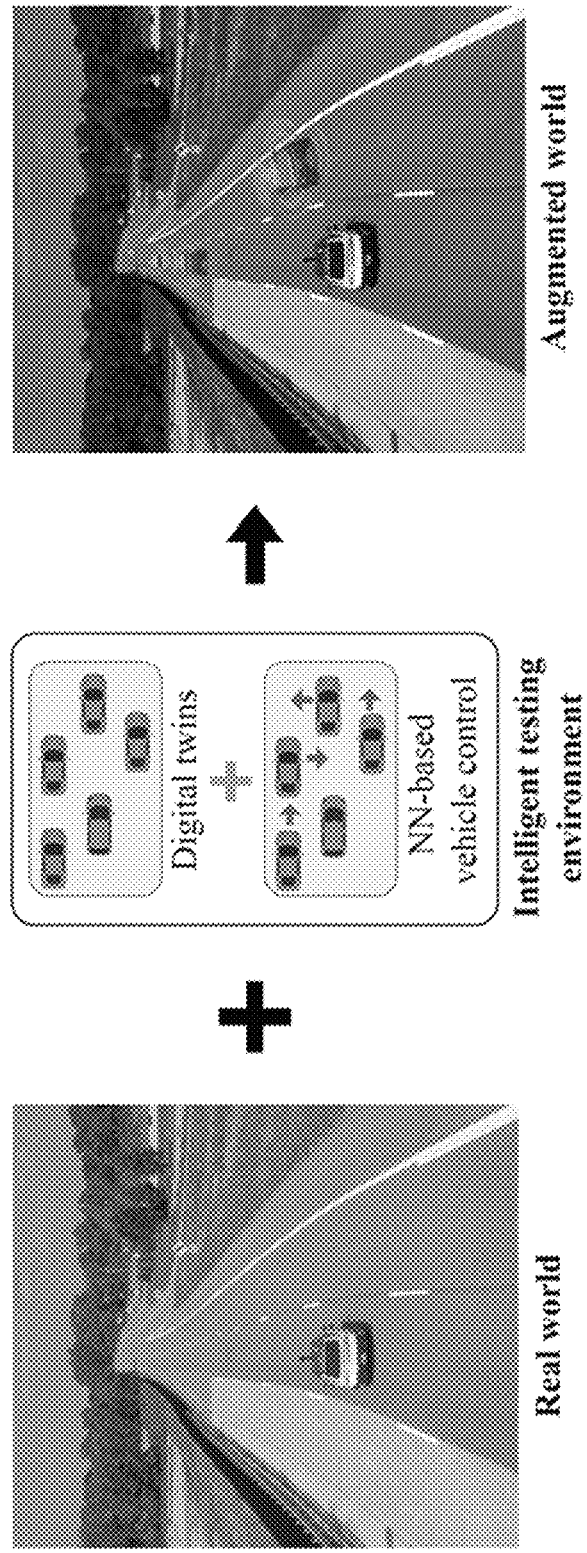
FIG. 5 shows an illustration of an augmented reality (AR) testing platform that can augment the real world with virtual background traffic, resulting in a safer and more controllable and efficient testing environment for AVs, at least according to embodiments.

The effectiveness of the disclosed system and method was tested using a real-world Level 4 AV with an open-source automated driving system, Autoware (27), in the physical 4-km-long highway test track at the American Center for Mobility (ACM) in Ypsilanti, Michigan. The accident rate of the AV driving continuously on the highway loop was evaluated in the experiments. To test the AV with the intelligent testing environment safely and precisely, an augmented reality testing platform (28) was developed, which combined the physical test track and a microscopic traffic simulator, SUMO (29). As shown in FIG. 5, by synchronizing the movements of the real AV and virtual background vehicles, the real AV in the physical test track can interact with the virtual background vehicles as if it is in a realistic traffic environment, where the background vehicles are controlled to interact with the real AV. As the intelligent testing environment is learned based on the NDE, modeled the NDE was modeled utilizing the large-scale naturalistic driving data from the Safety Pilot Model Deployment program (30) and the Integrated Vehicle-Based Safety System program (31) at the University of Michigan, Ann Arbor. Simulation experiments were conducted to demonstrate the effectiveness of the disclosed method comprehensively. Both simulation and field-testing results show that the D2RL approach is able to effectively learn the intelligent testing environment, which significantly accelerates the evaluation process by multiple orders of magnitude with the same accuracy, compared with the NDE testing approach, at least according to embodiments.

According to at least one embodiment, an AV testing system is provided, and the AV testing system includes at least one processor and memory coupled to the at least one processor. The memory stores computer instructions that, when executed by the at least one processor, cause the AV testing system to carry out the disclosed method. According to at least some embodiments, a method of safety testing an AV, such as a method of safety testing an AV in a naturalistic environment, is provided, and the method includes: generating a trained machine learning (ML) agent by: (i) obtaining a testing state model having non-safety-critical states and safety-critical states, (ii) editing the testing state model to obtain an edited testing state model that omits data concerning the non-safety-critical states, and (iii) training a ML agent using the edited state testing model so as to generate the trained ML agent; and testing the host AV in an environment that includes the one or more background vehicles configured to operate according to the trained ML agent.

According to at least some embodiments, a method of safety testing an AV, such as a method of safety testing an AV in a naturalistic environment, is provided, and the method includes: densifying training data by removing non-safety-critical data from the training data; training a neural network using the densified training data to obtain a machine learning (ML) agent; and testing the AV in an environment that includes one or more background vehicles, wherein the one or more background vehicles are configured to operate according to the ML agent.

The discussion below provides an exemplary implementation and discussion for the disclosed D2RL approach according to one embodiment. However, certain details and particulars discussed below will become apparent to those skilled in the art, and the disclosed D2RL approach is not necessarily limited to those details and particulars described below in this exemplary embodiment. The disclosed system and method, including the disclosed dense learning methodology, which is carried out using the disclosed D2RL approach, may be modified or tailored according to the particular application and/or testing desired.

Dense Deep Reinforcement Learning (D2RL). To leverage the advances in artificial intelligence (AI) techniques, the testing problem may be formulated as a sequential Markov decision process (MDP) (an example of a testing state model), where maneuvers of background vehicles (BVs) are decided based on the current states encoding information (e.g., position and speed) about the BVs and the host AV or AV under test. Based on the MDP formulation, a policy (a DRL agent) modeled by a neural network is trained, and this policy is used to control the maneuvers of BVs to interact with the AV, to maximize the evaluation efficiency and ensure unbiasedness. However, as mentioned earlier, applying learning-based techniques for safety-critical systems is highly challenging because of the "curse of dimensionality" and the "curse of rarity." At least for particular applications, it may be hard or even empirically infeasible to learn an effective policy if directly applying DRL approaches.

The disclosed D2RL approach addresses these challenges. Because of the rarity of safety-critical events, most states are uncritical and cannot provide information for safety-critical events. According to the disclosed D2RL approach, the data of these uncritical states is removed and only the informative data is utilized for training the neural network with the policy gradient estimation and bootstrapping. To achieve this, a new definition of uncritical (or non-safety-critical) state is used such that $v_\pi(s)=q_\pi(s,a)$, $\forall a$, where $q_\pi(s,a)$ denotes the state-action value under the DRL policy $\pi$ and $v_\pi(s) \stackrel{\text{def}}{=} \mathbb{E}_\pi(q_\pi(s,a))$ denotes the state value. It indicates that a state is defined as uncritical if the current action (e.g., maneuvers of one or more BVs) will not affect the expected value of the state (e.g., AV's accident probability from the state). It is noted that this definition is primarily for the theoretical analysis to be clean and is not strictly or necessarily required to run the algorithm in practice. For example, a state can be practically identified as uncritical if the current action will not significantly affect the expected value of the state. For specific applications, the critical states can be approximately identified based on specific models or physics, for example, the criticality measure (19, 20) is utilized in this study to demonstrate the approach for the AV testing problem, which is an outer approximation of the AV accident rate within a specific time horizon (e.g., 1 second) from the current state. It is noted that many other safety metrics (32) could also be applicable, such as the model predictive instantaneous safety metric (33) developed by the National Highway Traffic Administration in the United States and the criticality metric (34) developed by the PEGASUS project in Germany, as long as the identified set of states covers the critical states.

Figure 4A:
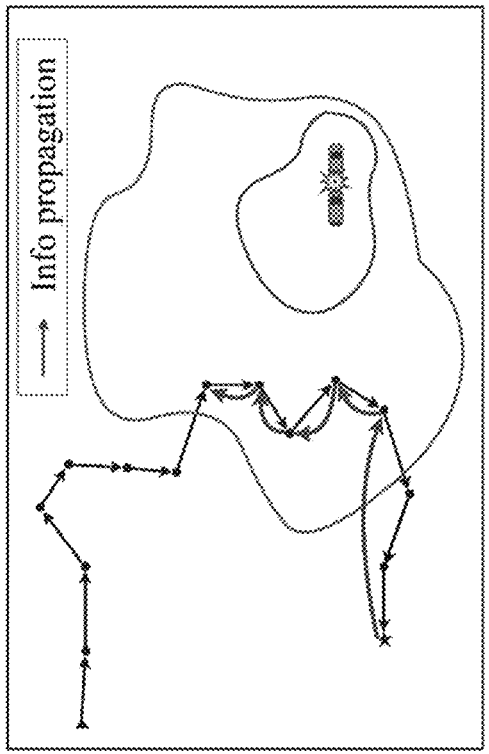
FIGS. 4A-C illustrate exemplary testing episodes or trips (referred to herein as "episodes") that may be edited using the disclosed dense deep reinforcement learning (D2RL) approach, where
Figure 4B:
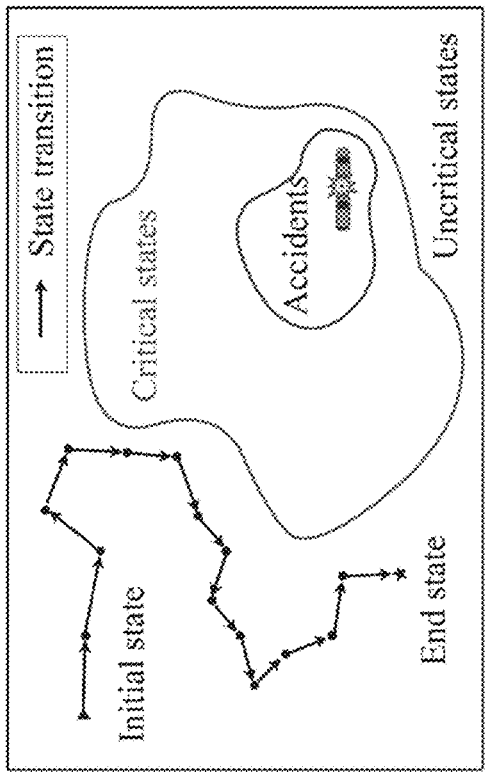
Figure 4C:
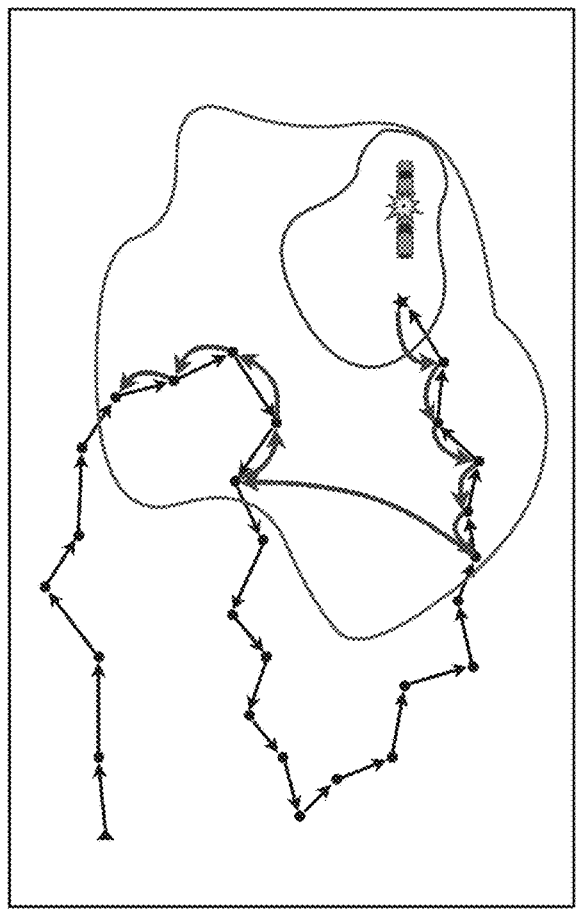
Figure 6:
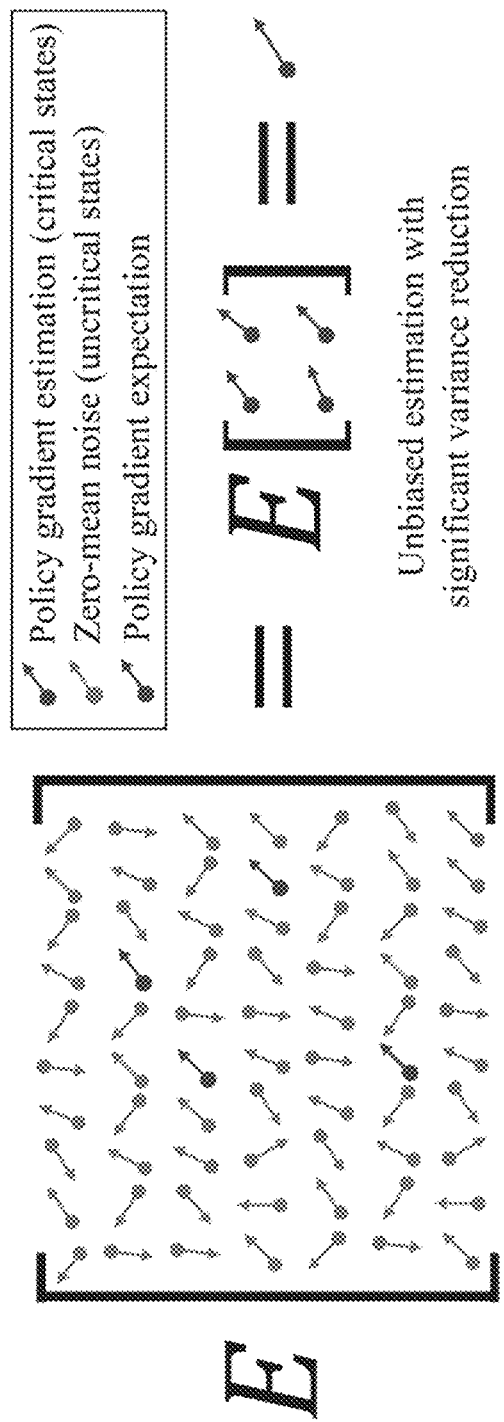
FIG. 6 illustrates policy gradient estimation of the disclosed D2RL approach compared to a DRL approach, where the D2RL approach removes most data of uncritical states that are not informative, which enables estimation of the policy gradient unbiasedly with significantly reduced variance.
Figure 7:
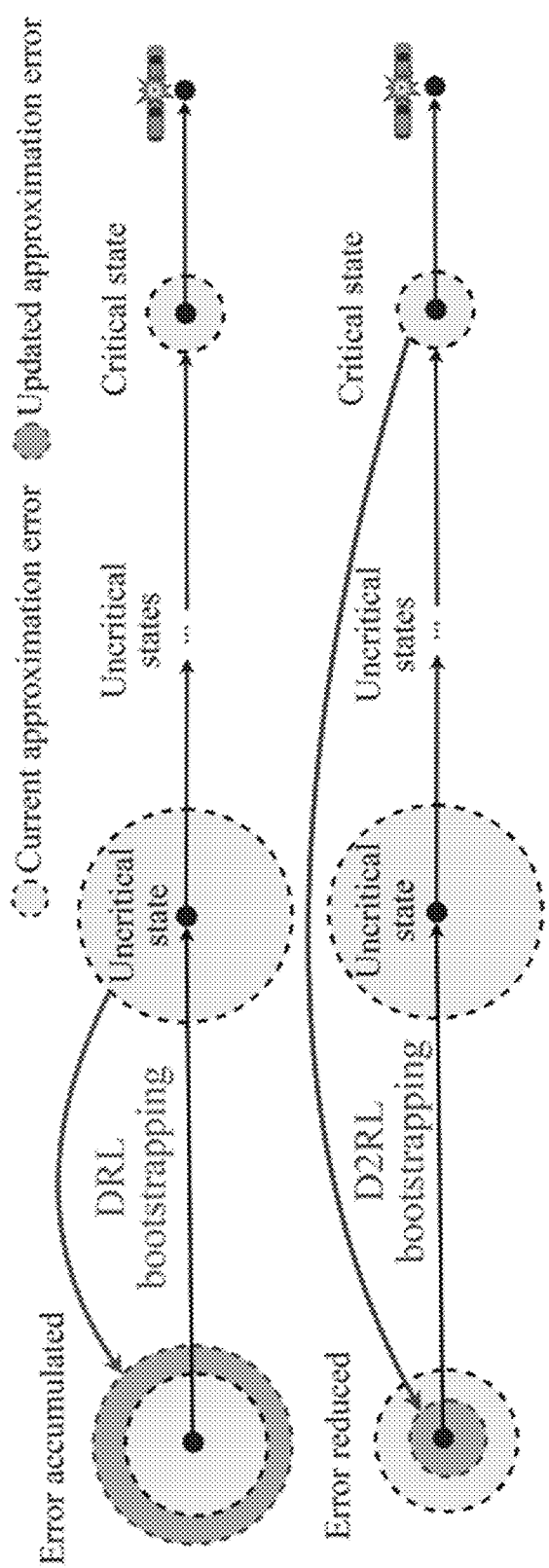
FIG. 7 illustrates bootstrapping where the disclosed D2RL approach is used to effectively propagate information from critical states to reduce value approximation errors, while DRL approaches cannot and may even increase the errors.

After the uncritical (or non-safety-critical) state is identified, the Markov decision process is edited to abandon or remove the data of the identified uncritical states, and use the remaining data for the policy gradient estimation and bootstrapping of the DRL training. FIGS. 4A-C illustrate the editing process: the episode that includes no critical state is removed completely (FIG. 4A), and the reward from the end state is backpropagated to the critical states for policy gradient estimation and bootstrapping (FIGS. 4B-C). It has been discovered that dense learning can dramatically reduce the variance of the policy gradient estimation with multiple orders of magnitude without loss of estimation unbiasedness, as shown below by Theorem 1. FIG. 6 illustrates the basic concept of this theorem: as the D2RL approach removes most data of uncritical states that are not informative, it can estimate the policy gradient unbiasedly with significantly reduced variance. The dense learning can also reduce the bootstrapping variance, as it can be regarded as a state-dependent temporal-difference learning (11), where only critical states are utilized, and others are skipped. As illustrated in FIG. 7, as critical states have much higher probabilities for leading to safety-critical events, the value approximations of critical states usually have much smaller errors, which can help reduce the errors through bootstrapping. In contrast, uncritical states could even increase the errors through bootstrapping because of the error accumulation. This mechanism can help avoid the interference of the large number of noisy data and keep the policy learning the sparse but valuable information.

Figure 8:
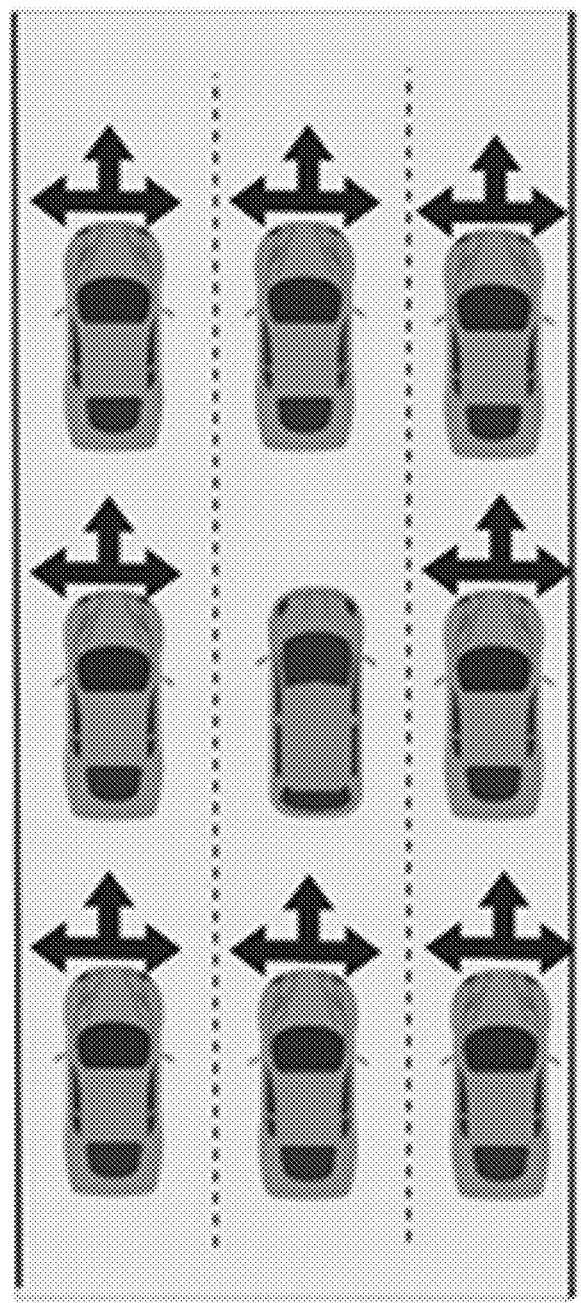
FIG. 8 depicts an illustration of a corner case generation problem where a neural network controls the closest eight vehicles' maneuvers.

To evaluate the effectiveness of dense learning, the DRL approach and the disclosed D2RL approach were compared for the corner case or adversarial example generation problem, which can be formulated as a well-defined reinforcement learning problem. Specifically, a three-lane highway driving environment was studied, where a host AV is interacting with tens of BVs for a certain distance (400 m), and each BV has 33 discrete actions at every 0.1 second: left lane change, 31 discrete longitudinal accelerations ([−4, 2] with 0.2 m s$^{-2}$ discrete resolution), and right lane change. By training a neural network, we aimed to maximize the AV's accident rate by controlling the closest eight BVs within 120 m, as shown in FIG. 8. Without using any heuristic-based reward functions or decentralized techniques, most existing corner case generation methods can only be used for scenarios with over-simplified state and action spaces, for instance, usually only one BV is controlled to be adversarial (16, 35). Proximal policy optimization (PPO) (36) was used to update the parameters of the policy network, given the reward for each testing episode, i.e., +20 for the AV accident and 0 for others. For both the DRL approach and the disclosed D2RL approach, the neural network was executed for all time steps with the same network structure and hyperparameters. The major difference is that DRL utilized all the data for training the neural network, while the disclosed D2RL approach only utilized the data of critical states for training the neural network.

Figure 9:
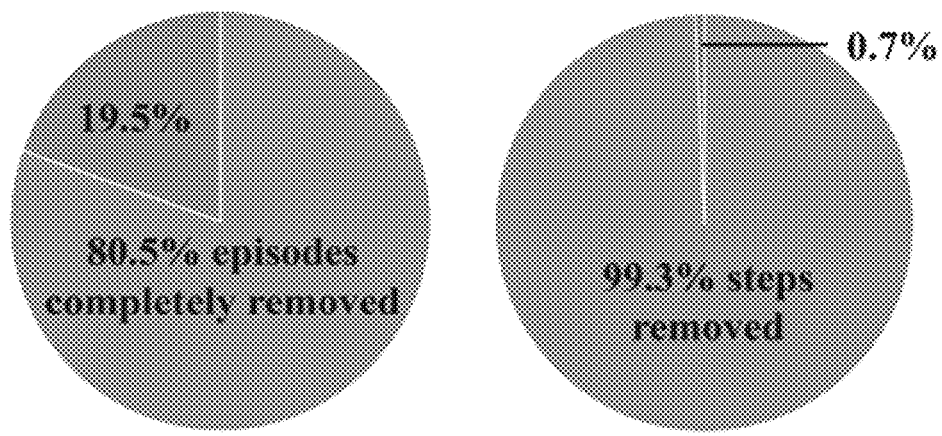
FIG. 9 depicts pie charts illustrating proportions of the removed data by D2RL regarding the episodes (left) and steps (right)
Figure 10A:
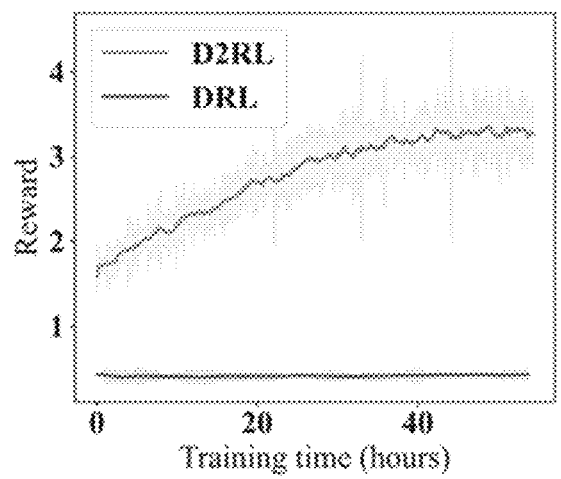
FIG. 10A depicts a graph of the amount of training time and reward for the DRL approach and the disclosed D2RL approach.
Figure 10B:
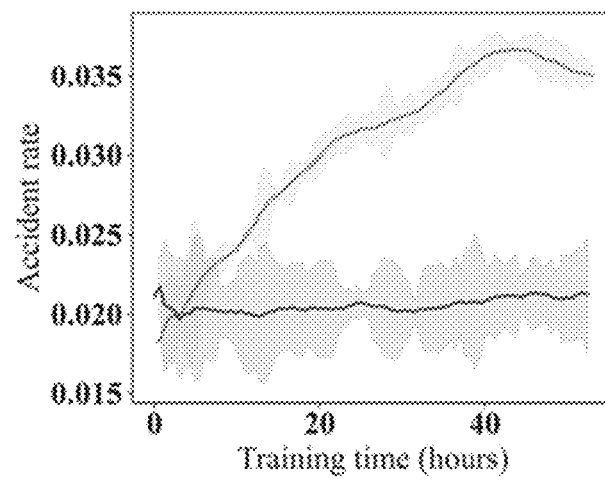
FIG. 10B depicts a graph of the amount of training time and accident rate for the DRL approach and the disclosed D2RL approach.
Figure 11:
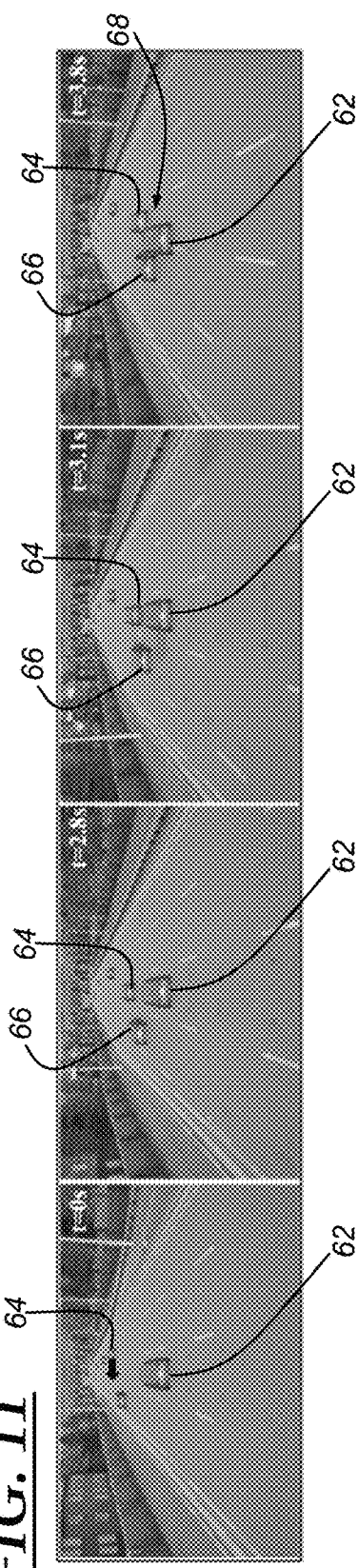
FIGS. 11-13 illustrate three generated adversarial examples: the first one (FIG. 11) demonstrates the capability of the disclosed D2RL approach for learning AV-responsible accidents, the second one (FIG. 12) demonstrates the capability of disclosed D2RL approach for learning cooperative behaviors of multiple vehicles, and the third one (FIG. 13) demonstrates the capability of the disclosed D2RL approach for propagating information between different critical states that are separated by uncritical states.
Figure 12:
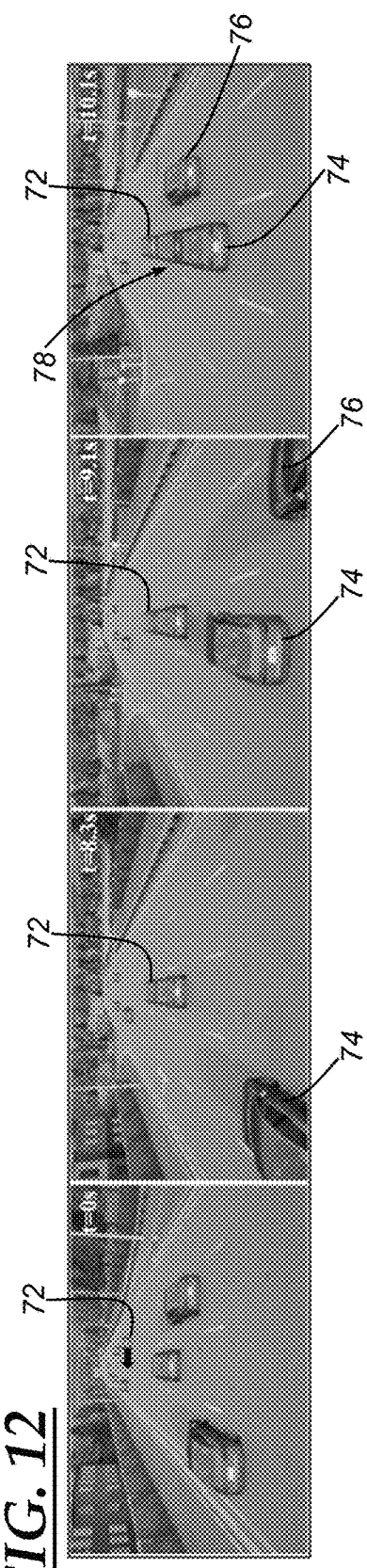
Figure 13:
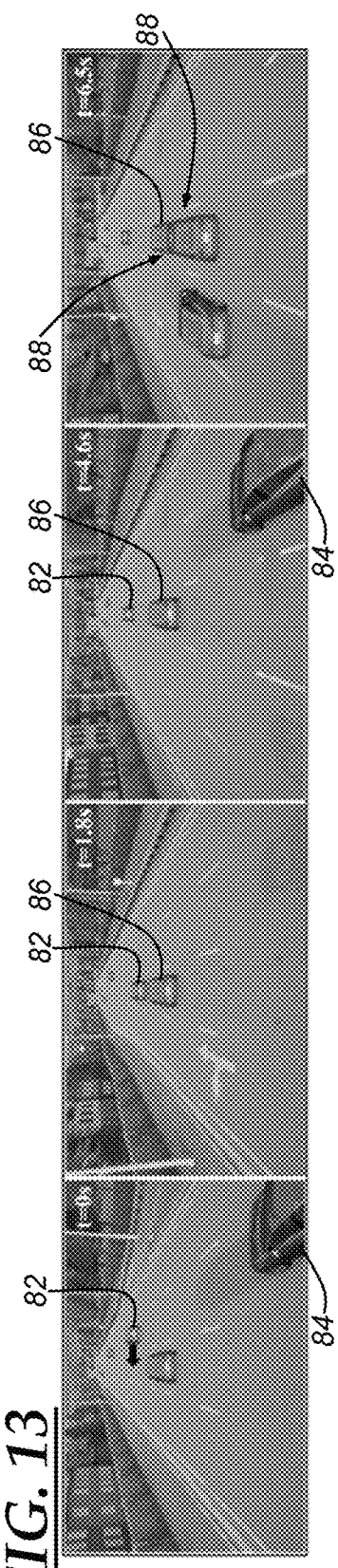

According to a case study, implementation of the disclosed D2RL approach resulted in removal of 80.5% complete episodes where no critical state was involved and 99.3% steps that were from uncritical states, compared with DRL (FIG. 9). FIG. 10A shows a comparison of training rewards between the DRL approach and the disclosed D2RL approach, where the solid line represents the moving average with the window of 20 and the light shadow represents the standard deviation of 5 neighborhood points. FIG. 10B shows a comparison of accident rates between the policies learned by the DRL approach and the disclosed D2RL approach. According to Theorem 1 (below), this indicates that the disclosed D2RL approach can reduce around 99.3% of the policy gradient estimation variance in this case, which enables the neural network from ineffective learning to effective learning: as shown in FIG. 10A, the disclosed D2RL approach can effectively learn to increase the reward during the training process, while the DRL was stuck from the beginning of the training process; and as shown in FIG. 10B, the policy learned by the disclosed D2RL approach can effectively increase the accident rate of the AV, while that of the DRL approach failed to do so. FIGS. 11-13 illustrate three generated adversarial examples: the first one (FIG. 11) demonstrates the capability of D2RL for learning AV-responsible accidents, the second one (FIG. 12) demonstrates the capability of D2RL for learning cooperative behaviors of multiple vehicles, and the third one (FIG. 13) demonstrates the capability of D2RL for propagating information between different critical states separated by uncritical states (see FIG. 4C as an example). In FIG. 11, the BV 62 made an evasive lane change to avoid an aggressive cut-in by BV 64 but collided with an adjacent BV 66 as shown at accident 68. In FIG. 12, BV 72 makes a cut-in, another BV 74 made a right lane change, while yet another BV 76 accelerated, which cooperatively encircled the host AV and caused an accident 78. In FIG. 13, BV 82 made a cut-in to enforce the host AV for braking, which created the opportunity for the BV 84 to make a lane change after 2.8 seconds (i.e., 28 uncritical steps in the present embodiment using a 0.1 second interval), leading to an accident 88 as a result of BV 86 having to apply the brakes due to the lane change of the BV 84. In this scenario, the cut-in behavior of the BV 82 cannot cause any immediate accident and the only reason for doing so is to create the opportunity for the following vehicle's (BV 84) cut-in behavior after 28 steps' uncritical states.

Learning the intelligent testing environment. The following provides a discussion of exemplary implementation aspects of and/or related to the disclosed D2RL approach. Learning the intelligent testing environment for unbiased and efficient AV evaluation may be much more complex than the corner case generation. According to the importance sampling theory (37), the goal is essentially to learn a new sampling distribution, i.e., importance function, of BVs' maneuvers to replace their naturalistic one, which aims to minimize the estimation variance of AV testing. To achieve this goal, without using any heuristics or handcrafted functions, the reward function is derived from the estimation variance as:

$$r(x) = -\mathbb{1}_A(x) \cdot W_{q_\pi}(x) \cdot W_{q_{\pi_b}}(x) \tag{1}$$

where x denotes the variables of each testing episode, $\mathbb{1}_A(x)$ is an indicator function of the AV accident, and $W_{q_\pi}(x) = P(x)/q_\pi(x)$ and $$W_{q_{\pi_b}}(x) = P(x)/q_{\pi_b}(x)$$

are weights (or likelihood) produced by the importance sampling. Here, P(x) denotes the naturalistic distribution, $q_\pi(x)$ denotes the importance function with the target policy $\pi$, and $q_{\pi_b}(x)$ denotes the importance function with the behavior policy $\pi_b$. For on-policy learning mechanism, we have $\pi = \pi_b$ (11) It can be shown that maximizing the reward function in Eq. (1) is equivalent to minimizing the estimation variance. To make the reward function balanced about zero, which is a good practice for reinforcement learning, a positive constant is added, a constant is multiplied, and the function is clipped, resulting in the reward function as r(x) ∈ [−100,100], where all these constants could be automatically determined during the learning process. More details can be found below and/or in the attached appendix. As there is no heuristic or handcrafted immediate reward function, the reward function in Eq. (1) is highly consistent with the testing performance, i.e., a higher reward indicates a more efficient testing environment in the present embodiment. As it is mainly based on the importance sampling theory, the reward function is also applicable to other rare event estimation problems with high-dimensional variables.

To determine the learning mechanism, the relationship between the behavior policy $\pi_b$ and target policy $\pi$ may be investigated. As proved in Theorem 2 below, it is discovered that the optimal behavior policy $\pi^*_b$ that collects data during the training process is nearly inversely proportional to the target policy, namely:

$$q_{\pi^*_b}(x) \propto \frac{q^2_{\pi^*}(x)}{q_\pi(x)}, \tag{2}$$

where $q_{\pi^*}(x)$ denotes the optimal importance sampling function that is unchanged during the training process. It indicates that, if using on-policy learning mechanisms ($q_{\pi_b} = q_\pi$), the behavior policy would be far from optimal, particularly at the beginning of the training process ($q_\pi$ is far from $q_{\pi^*}$), which could mislead the training process and eventually cause the underestimation issues. To address this issue, an off-policy learning mechanism is designed, where a generic behavior policy is designed and kept unchanged during the training process. Specifically, the behavior policy controls the BVs' maneuvers following their naturalistic distribution most of the time (with the probability 0.99) and controls their maneuvers to be adversarial with a small probability (0.01), where the adversarial maneuvers can be obtained by the criticality measure. Although this off-policy mechanism is not the optimal behavior policy as in Eq. (2) that is usually unavailable in practice, it can balance the exploration and exploitation and is empirically effective for all experiment settings in this study.

With the reward function and off-policy learning mechanism, the intelligent testing environment is learned by the D2RL approach. In this study, the PPO algorithm implemented at the RLLib 1.2.0 platform (38) was used. It is noted that the disclosed D2RL approach may be easily applied in most existing DRL platforms and complement most DRL techniques. To provide a training environment, a multi-lane highway driving environment was constructed based on the SUMO simulation (29), where all vehicles were controlled at every 0.1 seconds with the same action space as in the corner case generation study. The NDE was built to provide naturalistic behaviors of BVs according to the large-scale naturalistic driving datasets (NDD).

Empirical evaluation. The following provides an empirical evaluation of one implementation of the disclosed D2RL approach, according to one embodiment. To measure the safety performance, accident rates of the AVs in NDE may be utilized as the benchmark. As the NDE is generated based on NDD, it can represent the safety performance of AVs in the real world. In experiments, a comparison of the estimated accident rates and required number of tests for both NDE and the intelligent testing environment may be carried out. A single test was conducted for a constant driving distance of AVs, then the test results of AVs (accident or not) were recorded, and the accident rate per test was calculated; the accident rate per test can be easily transformed to accident rate per mile. To investigate the scalability and generalizability, simulation experiments were conducted with different numbers of lanes (2 and 3 lanes), constant driving distances (400 m, 2 km, 4 km, and 25 km), and AV models. Specifically, two different types of AV models were developed: the AV-I model was constructed based on the intelligent driving model (IDM) (39) and the MOBIL (Minimizing Overall Braking Induced by Lane change) model (40), while the AV-II model was trained by DRL techniques considering both driving efficiency and safety.

Figure 14A:
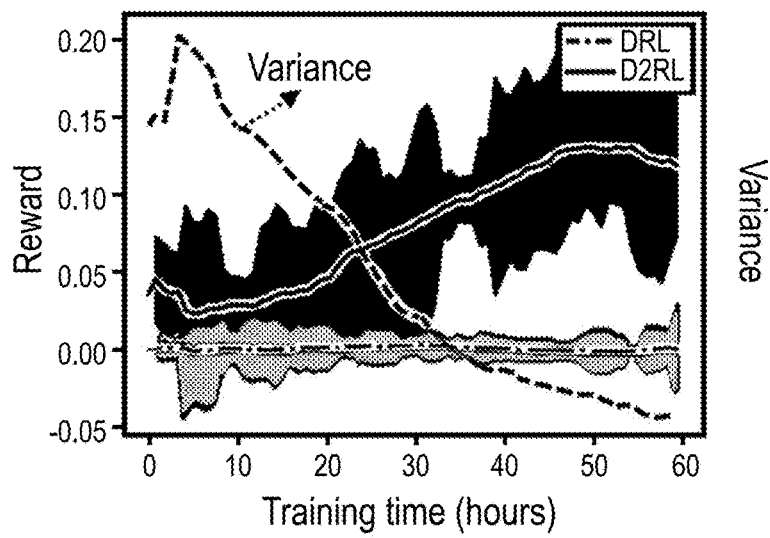
FIG. 14A shows a graph of a comparison of the reward between the DRL and disclosed D2RL approaches and the corresponding variance of the disclosed D2RL approach that represents the testing efficiency.
Figure 14B:
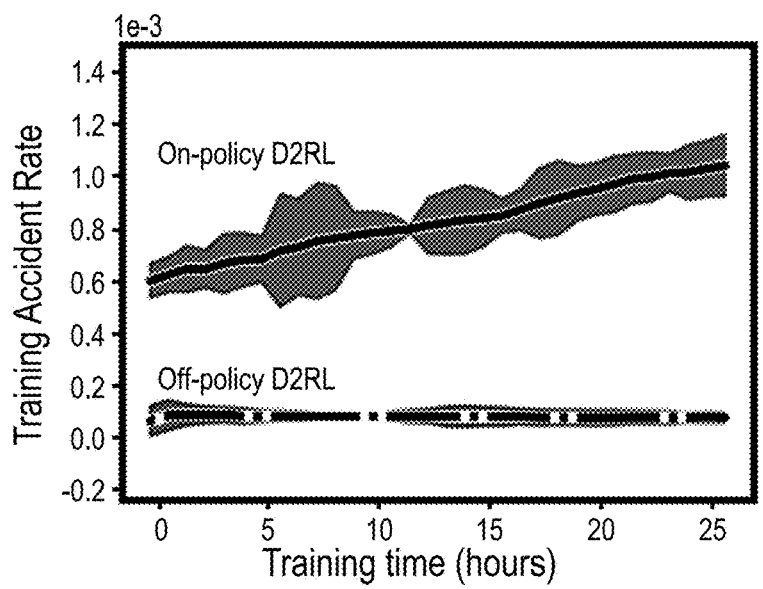
FIG. 14B shows a graph of accident rates of the on-policy and off-policy D2RL approaches during the training process with the same calculation of moving average and standard variance.
Figure 14C:
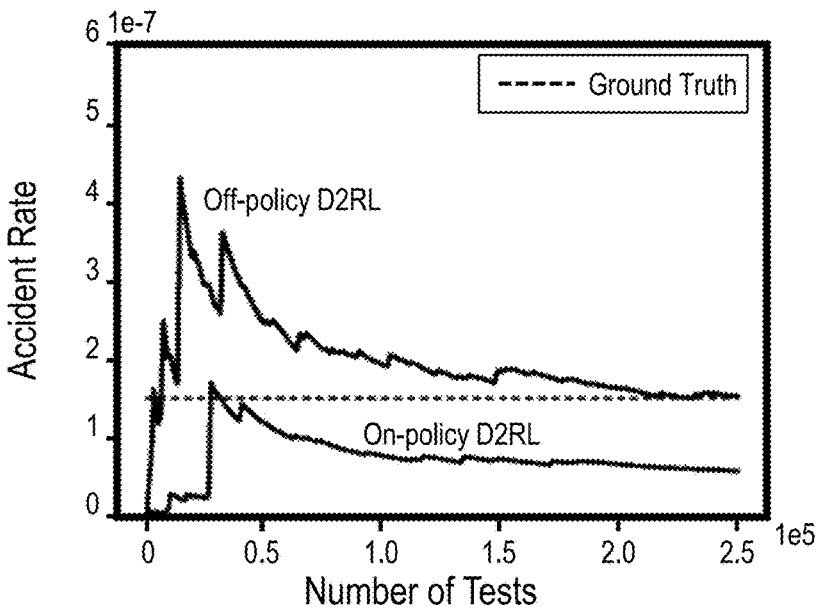
FIG. 14C shows a graph of accident rate estimations of a first AV model, the AV-I model, by testing environments obtained by the on-policy and off-policy D2RL approaches.
Figure 14D:
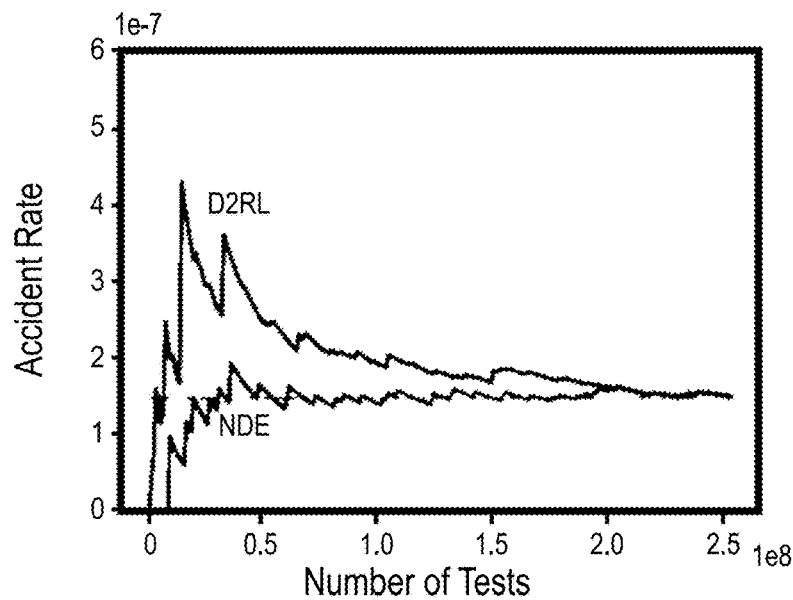
FIGS. 14D and 14E show a graph of accident rate estimations and relative half-width of the AV-I model, respectively.
Figure 14E:
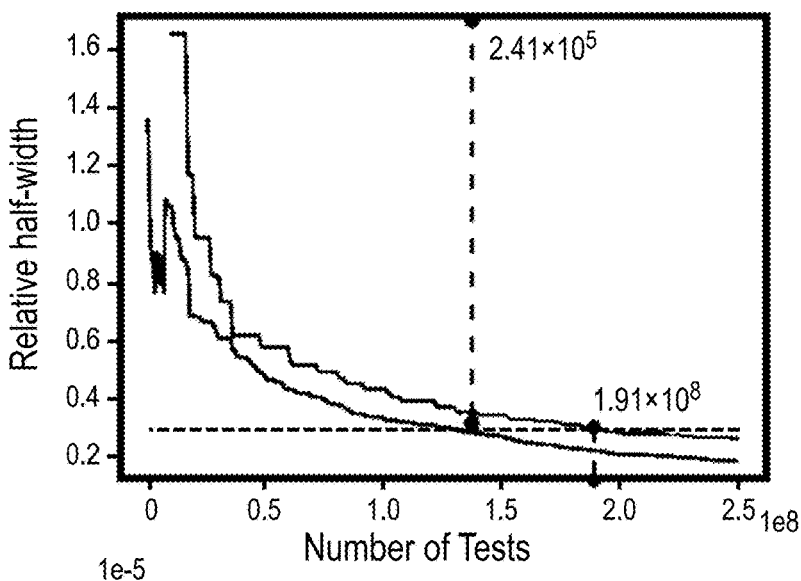
Figure 14F:
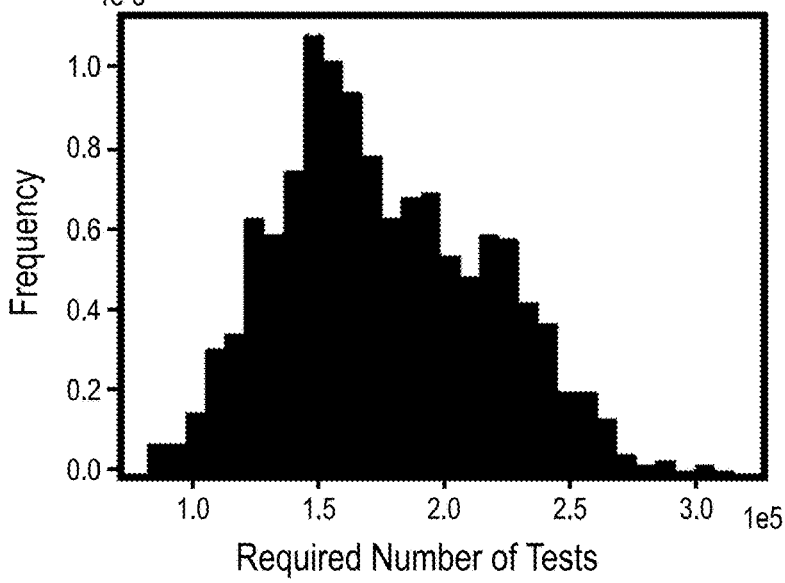
FIG. 14F shows a graph of a frequency of the required number of tests for repeated testing experiments, where the AV-I model is tested by the intelligent testing environment.
Figure 14G:
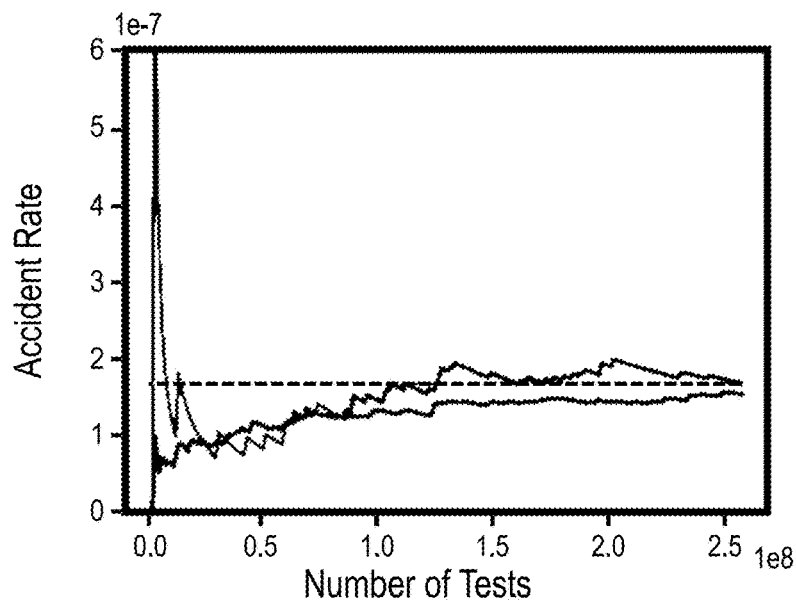
FIGS. 14G and 14H show a graph of accident rate estimations and relative half-width of a second AV model, the AV-II model, by the NDE and the D2RL-based intelligent testing environment.
Figure 14H:
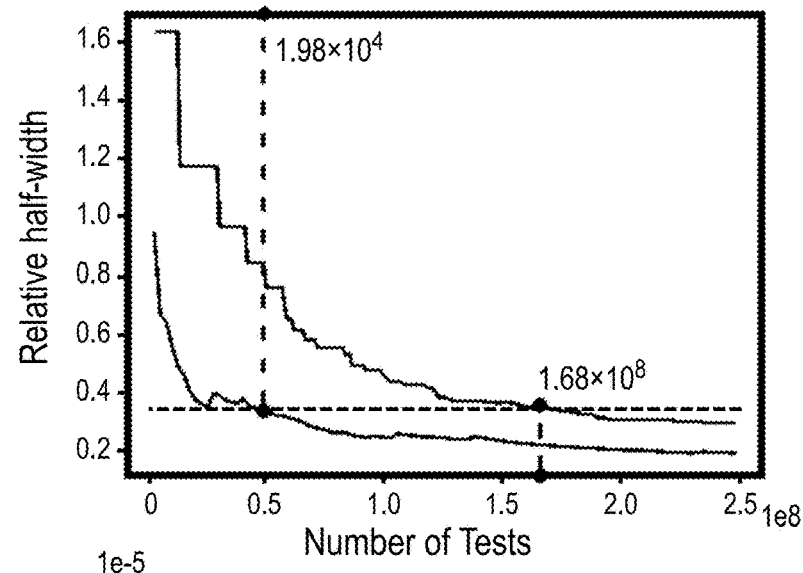
Figure 14I:
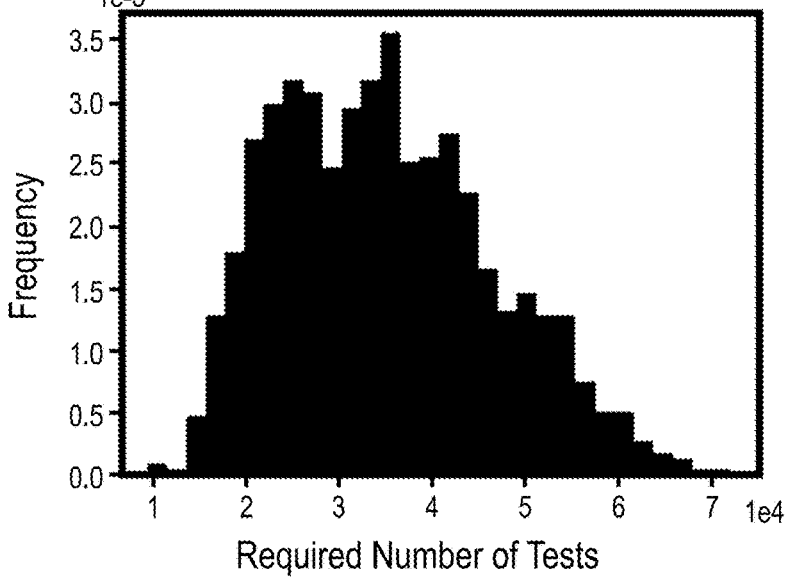
FIG. 14I shows a graph of a frequency of the required number of tests for repeated testing experiments, where the AV-II model is tested by the intelligent testing environment.

FIGS. 14A-14I show the results of the 2-lane highway driving environment with the 400 m driving distance, which is a basic experiment to validate our method. FIGS. 14A-14F show the results of the AV-I model, and FIGS. 14G-14I the results of the AV-II model. As shown in FIG. 14A, during the training process, the estimation variance of the intelligent testing environment decreases with the increase of reward function, which validates the consistency between the reward function in Eq. (1) and the estimation variance. To justify the off-policy mechanism, the performance of the on-policy mechanism was investigated, where the target policy was utilized as the behavior policy. As shown in FIG. 14B, during the training process, the accident rate of the on-policy agent significantly increases, while the accident rate of the off-policy is unchanged because the behavior policy is unchanged. However, as the on-policy mechanism could violate the consistency between the reward function and estimation variance, this increase of the accident rate would be misleading. As shown in FIG. 14C, the testing environment obtained by the on-policy mechanism underestimates the safety performance of the AV-I model. Differently, the disclosed D2RL approach obtains the same accident rate estimation by a much smaller number of tests than the NDE testing method, as shown in FIGS. 14D-14E. To measure the efficiency, the relative half-width (19, 20) was calculated as the measurement of evaluation precision and calculated the minimum number of tests for reaching a predetermined precision threshold (0.3). To reduce the randomness of the results for a fair comparison, the testing of the disclosed approach was repeated by bootstrap sampling and obtained the frequency and average of the required number of tests, as shown in FIG. 14F. Compared with the NDE method that required $1.9 \times 10^8$ number of tests, the disclosed D2RL approach only required an average of $1.7 \times 10^5$ number of tests, which is more than one thousand times faster than the NDE method. To investigate the generalizability of the intelligent testing environment, the AV-II model was further tested using the same intelligent testing environment without any refinement, which can also obtain an accurate and efficient estimation (i.e., about ten thousand times faster), as shown in FIGS. 14G-I.

To further investigate the scalability and generalizability of the disclosed D2RL approach, the experiments were conducted with different numbers of lanes (2 and 3 lanes) and driving distances (400 m, 2 km, 4 km, and 25 km). Here, the 25 km case was studied since the average commuter travels approximately 25 km one way according to the Bureau of Transportation Statistics in United States Department of Transportation, which can demonstrate the effectiveness of the disclosed D2RL approach over full-length trips. As shown in Table 1, because of the skipped episodes and steps that significantly reduce the training variance, the disclosed D2RL approach can effectively learn the intelligent testing environment for all the experiments, which can obtain the same accident rate estimation by a much smaller number of tests, compared with the NDE testing method. Here, the numbers of tests for the disclosed D2RL approach were the average values of multiple testing experiments, similar to FIGS. 14F, 14I, and the numbers of tests for the NDE method were calculated according to the Monte Carlo method (37). It demonstrates the capability of the disclosed D2RL approach for overcoming the spatiotemporal limitations of existing methods, which is significant for real-world applications. For example, the highway loop at the American Center for Mobility (ACM) is 2 lanes and 4 km long, and the disclosed D2RL approach provides the capability for generating the intelligent testing environment on such a highway environment, a task that cannot be accomplished by existing methods.

FIGS. 14A-I show performance evaluation of the disclosed D2RL approach. In particular, FIG. 14A shows a graph of a comparison of the reward between the DRL and D2RL approaches and the corresponding variance of the D2RL approach that represents the testing efficiency. The solid line represents the moving average with the window of 20 and the light shadow represents the standard deviation of 5 neighborhood points. FIG. 14B shows a graph of accident rates of the on-policy and off-policy D2RL approaches during the training process with the same calculation of moving average and standard variance. FIG. 14C shows a graph of accident rate estimations of the AV-I model by testing environments obtained by the on-policy and off-policy D2RL approaches. The light shadow represents the 90% confidence level. FIGS. 14D and 14E show a graph of accident rate estimations and relative half-width of the AV-I model and FIGS. 14G and 14H show a graph of accident rate estimations and relative half-width of the AV-II model by NDE and the D2RL-based intelligent testing environment, respectively. The bottom x-axis denotes the number of tests for NDE, and the top x-axis denotes the number of tests for the intelligent testing environment. FIGS. 14F and 14I show a graph of a frequency of the required number of tests for repeated testing experiments, where the AV-I model (FIG. 14F) and the AV-II model (FIG. 14I) are tested by the intelligent testing environment, respectively.

Formulation of validation problem. This section describes the problem formulation of the safety performance evaluation of AVs according to one implementation or embodiment. Denote the variables of the driving environment as x=[s(0), u(0), u(1), . . . , u(T)], where s(k) denotes the states (position and speed) of the AV and background vehicles (BVs) at the k-th time step, u(k) denotes the maneuvers of BVs at the k-th time step, and T denotes the total time steps of this testing episode. With Markovian assumptions of BVs' maneuvers, the probability of each testing episode in the naturalistic driving environment can be calculated as $P(x)=P(s(0)) \times \Pi_{k=0}^{T} P(u(k)|s(k))$, and then the AV accident rate can be measured by the Monte Carlo method (32) as $$P(A) = \mathbb{E}_{x \sim P(x)}[P(A \mid x)] \approx \frac{1}{n}\sum_{i=1}^{n} P(A \mid x_i), \, x_i \sim P(x) \quad (3)$$

where A denotes the accident event, n denotes the total number of testing episodes, and $x_i \sim P(x)$ indicates that the variables are sampled from the distribution P(x). As A is a rare event, obtaining a statistically reliable estimation requires a large number of tests (n), which leads to the severe inefficiency issue of the on-road testing approach, as pointed out in (6).

To address this inefficiency issue, an intelligent driving environment is generated, where BVs can be controlled purposely to test the AV unbiasedly and efficiently. In essence, testing an AV in the intelligent driving environment is to estimate P(A) in Eq. (3) by the importance sampling method (37) as:

$$P(A) = \mathbb{E}_{x \sim q(x)}[P(A|x) \times W_q(x)] \approx \frac{1}{n} \sum_{i=1}^{n} P(A|x_i) \times W_q(x_i), \ x_i \sim q(x) \quad (4)$$

where q(x) denotes the underlying distribution of BVs' maneuvers in the intelligent testing environment, and $W_q(x)$ is the likelihood of each testing episode as $$W_q(x) = \frac{P(x)}{q(x)} = \Pi_{k=0}^{T}\left[\frac{p(u(k)|s(k))}{q(u(k)|s(k))}\right] \quad (5)$$

According to the importance sampling theory (32), the unbiasedness of the estimation in Eq. (4) can be guaranteed if q(x)>0 for any x that P(A|x)P(x)>0. To optimize the estimation efficiency, the importance function q(x) needs to minimize the estimation variance $$\sigma_g^2 = \mathbb{E}_q(P^2(A|x) \times W_q^2(x)) - P^2(A) \quad (6)$$

Therefore, the generation of the intelligent testing environment is formulated as a sequential Markov decision process (MDP) problem of BVs' maneuvers (i.e., determine q(u(k)|s(k))) to minimize the estimation variance $\sigma_q^2$ in Eq. (6). However, how to solve such a sequential MDP problem associated with a rare event and high-dimensional variables remains a highly challenging problem, and most existing importance sampling-based methods suffer from the "curse of dimensionality" (43), where the estimation variance would increase exponentially with the variable dimensionality. In a previous study (22), it was discovered that the "curse of dimensionality" issue could be addressed theoretically by sparse adversarial control to the naturalistic distribution. However, only a model-based method with handcrafted heuristics was utilized for conducting the sparse adversarial control, which suffers from significant spatiotemporal limitations, and conventional methodologies are not able to leverage AI techniques to train the BVs for truly learning the testing intelligence.

Formulation of deep reinforcement learning problem. This section describes how to generate the intelligent testing environment as a DRL problem, at least according to one embodiment. As mentioned above, at least in some embodiments, the goal is to minimize the estimation variance in Eq. (6) by training a policy π modeled by a neural network θ that can control BVs' maneuvers with the underlying distribution $q_π(u|s)$. To keep the notation simple, it is left implicit in all cases that π is a function of θ. An MDP usually consists of four key elements: state, action, state transition, and reward. In this study, states encode information (position and speed) about the AV and surrounding BVs (the closest eight vehicles within 120 m), actions include 31 discrete longitudinal accelerations ([−4, 2] with 0.2 m s$^{-2}$ discrete resolution), left lane change, and right lane change, and state transitions define the probability distribution over next states that are also dependent on the AV maneuver. Of course, the learning problem and methodology may be adapted to other BV actions or maneuvers and/or actions or maneuvers of other road users. To keep the runtime of the DRL small, the output of the neural network was simplified as the adversarial maneuver probability ($\varepsilon_π$) of the most critical BV (i.e., principal other vehicle or "POV"), while POV's other maneuvers are normalized by 1−$\varepsilon_π$ according to the naturalistic distribution and other BVs' maneuvers keep following the naturalistic distribution. The adversarial maneuver and POV are determined by the criticality measure. It is noted that the generalization of this work to multiple POVs is straightforward with more computational resources. To demonstrate the generalization of this approach, the action space of eight POVs' maneuvers was kept in the corner case generation problem.

The reward function design is critical for the DRL problem (44). As the goal of the intelligent testing environment is to minimize the estimation variance in Eq. (6), the objective function of the DRL problem was derived as:

$$\min_q \sigma_q^2 = \max_π \left\{-\mathbb{E}_{q_{π_b}}\left(\mathbb{I}_A(x) \times W_{q_π}(x) \times W_{q_{π_b}}(x)\right)\right\} \quad (7)$$

where $\mathbb{I}_A$ is the indicator function of the accident event, $π_b$ denotes the behavior policy of the DRL, and $π_b=π$ is used for on-policy learning mechanisms. During the training process, the training data is collected by the behavior policy, which is a Monte Carlo estimation of the expectation in Eq. (7), so we can obtain the reward function as $$r(x) = -\mathbb{I}_A(x) \cdot W_{q_π}(x) \cdot W_{q_{π_b}}(x) \quad (8)$$

which is theoretically consistent with the objective function. To make the reward function balanced about zero, which is a good practice for reinforcement learning, a positive constant is added, a constant is multiplied, and the function is clipped, resulting in the reward function as r'(x)∈[−100, 100], namely, r'(x)=clip[$C_1$·r(x)+$C_2$, −100, 100], where all these constants $C_1$ and $C_2$ could be automatically determined during the learning process to make the reward balanced. Please note that this approach does not use any heuristics or handcrafted functions for the reward function design, which could be misleading.

Dense Deep Reinforcement Learning (D2RL). With the state, action, state transition, and reward function, the intelligent testing generation problem becomes a DRL problem with the challenge of "curse of dimensionality" and "curse of rarity." To address this challenge, the disclosed D2RL approach may be used. Specifically, according to the policy gradient theorem (11), the policy gradient of the objective function for DRL approaches can be estimated as:

$$\overrightarrow{\nabla J(\theta)} = \hat{q}_π(S_t, A_t) \frac{\nabla π(A_t|S_t, \theta)}{π(A_t|S_t, \theta)} \quad (9)$$

where θ denotes the parameters of the policy, $q_π(S_t, A_t)$ denotes the state-action value, $S_t$ and $A_t$ are samples of the state and action under the policy, $\hat{q}_π(S_t, A_t)$ is an unbiased estimation of $q_π(S_t, A_t)$, i.e., $\mathbb{E}_π[\hat{q}_π(S_t,A_t)]=q_π(S_t, A_t)$. Differently, for the D2RL approach, it is proposed to estimate the policy gradient as:

$$\nabla_{dense}\overrightarrow{J}(\theta) = \hat{q}_π(S_t, A_t) \frac{\nabla π(A_t|S_t, \theta)}{π(A_t|S_t, \theta)} \mathbb{I}_{s_t \in \mathbb{S}_c} \quad (10)$$

where $\mathbb{S}_c$ denotes the set of critical states and $\overrightarrow{\nabla J(\theta)}$ denotes the indicator function. Here, a state is defined as an uncritical state if $v_\pi(s)=q_\pi(s, a)$, $\forall a$, where $v_\pi(s) \stackrel{\text{def}}{=} \mathbb{E}_\pi(q_\pi(s, a))$ denotes the state value, so the set of critical states can be defined as $\mathbb{S}_c \stackrel{\text{def}}{=} \{s|v_\pi(s) \neq q_\pi(s,a), \exists a\}$. It indicates that a state is defined as uncritical if the current action (e.g., BVs' maneuvers) will not affect the expected value of the state (e.g., AV's accident probability from the state).

Theorem 1: The policy gradient estimator of D2RL has the following properties:

(1) $\mathbb{E}_\pi[\widetilde{\nabla_{dense}J}(\theta)] = \mathbb{E}_\pi[\widetilde{\nabla J(\theta)}]$, (2) $\text{Var}_\pi[\widetilde{\nabla_{dense}J}(\theta)] \leq \text{Var}_\pi[\widetilde{\nabla J(\theta)}]$, and (3) $\text{Var}_\pi[\widetilde{\nabla_{dense}J}(\theta)] \leq \rho_\pi \text{Var}_\pi[\widetilde{\nabla J(\theta)}]$, with the assumption $$\mathbb{E}_\pi[\sigma_\pi^2(S_t,A_t) \cdot \mathbb{I}_{S_t \in \mathbb{S}_c}] = \mathbb{E}_\pi[\sigma_\pi^2(S_t,A_t)] \cdot \mathbb{E}_\pi[\mathbb{I}_{S_t \in \mathbb{S}_c}], \quad (11)$$

where $\rho_\pi \stackrel{\text{def}}{=} \mathbb{E}_\pi(\mathbb{I}_{S_t \in \mathbb{S}_c}) \in [0,1]$ is the proportion of critical states in all states under the policy $\pi$ (see FIG. 9 as an example), and $$\sigma_\pi^2(S_t, A_t) = \left(\hat{q}_\pi(S_t, A_t) \frac{\nabla \pi(A_t | S_t, \theta)}{\pi(A_t | S_t, \theta)}\right)^2.$$

Theorem 1 shows that the disclosed D2RL approach has an unbiased and efficient estimation of the policy gradient compared with the DRL approach. To quantify the variance reduction of dense learning, the assumption in Eq. (11) is introduced, which assumes that $\sigma_\pi^2(S_t, A_t)$ is independent on the indicator function $\mathbb{I}_{S_t \in \mathbb{S}_c}$. As both the policy and the state-action values are randomly initialized, the values of $\sigma_\pi^2(S_t, A_t)$ are quite similar for all different states, so the assumption is valid at the early stage of the training process. Such significant variance reduction will enable the disclosed D2RL approach to optimize the neural network, while the DRL approach would be stuck at the beginning of the training process. It is noted that the definition of uncritical state and the assumption are primarily for the theoretical analysis to be clean and may not be strictly required to run the algorithm in practice. For example, a state can be practically identified as uncritical if the current action will not significantly affect the expected value of the state. Those skilled in the art will appreciate that identifying uncritical (or non-critical) states or critical states, or the definition of what constitutes an uncritical (or non-critical) state or critical state, is defined according to the application or implementation in which the disclosed D2RL approach is to be used as the particular bounds of what constitutes a critical state may be selected based on the particular application in which the disclosed D2RL approach is used.

The influence of dense learning on estimating $\hat{q}_\pi(S_t, A_t)$ with bootstrapping can guide the information propagation in the state-action space. For example, the fixed-length advantage estimator ($\hat{A}_t$) is commonly used for the PPO algorithm (36) as:

$$\hat{A}_t = \delta_t + (\gamma\lambda)\delta_{t+1} + \ldots + (\gamma\lambda)^{L-t+1}\delta_{L-1} \quad (12)$$

where $\delta_t = r_t + \gamma V(s_{t+1}) - V(s_t)$, $V(s_t)$ is the state-value function, and L denotes the fixed length. For safety-critical applications, the immediate reward is usually zero (i.e., $r_t=0$), and most state-value functions are determined by initial random values without any valuable information because of the rarity of events. Using such noisy state-value functions will not bootstrap the learning process but hinder valuable information. By editing the Markov chain, only the critical states will be considered. Then, the advantage estimator will be essentially modified as:

$$\overline{A}_t = \delta_{z(t,0)} + (\gamma\lambda)\delta_{z(t,1)} + \ldots + (\gamma\lambda)^{L-t+1}\delta_{z(t,L-1)} \quad (13)$$

where $$\delta_{z(t,j)} = r_{z(t,j)} + \gamma V(s_{z(t,j+1)}) - V(s_{z(t,j)}), \, z(t, 0) = t,$$

$$\text{and } z(t, j) = \min_i\{i > z(t, j-1) | s_i \in \mathbb{S}_c\}, j > 0.$$

In essence, it is a state-dependent temporal-difference (TD) learning, where only the values of critical states are utilized for bootstrapping. As the critical states have much higher probabilities for leading safety-critical events, the reward information can be propagated to these critical state values more easily. Utilizing the values of these critical states, the bootstrapping can guide the information from the safety-critical events to the state-action space more efficiently.

Because of the abovementioned variance reductions regarding the policy gradient estimation and bootstrapping, the disclosed D2RL approach significantly improves the learning effectiveness compared with the DRL approach, enabling the neural network to learn from the safety-critical events. It opens the door for leveraging AV techniques for safety-critical autonomous systems, including the corner case generation problem and intelligent testing environment generation problem in this study.

Off-policy learning mechanism. At least in some embodiments, the goal of the behavior policy $\pi_b$ is to collect training data for improving the target policy $\pi$ that can maximize the objective function in Eq. (7). To achieve this goal, it is critical to estimate the objective function accurately using the reward function in Eq. (8), which determines the calculation of the policy gradient. However, because of the rarity of accidents, only rare episodes have nonzero rewards, so the objective function estimation suffers from the extreme variance. Without an accurate estimation of the objective function, the training could be misled. According to the importance sampling theory, the following theorem is provided:

Theorem 2: At least in some embodiments, the optimal behavior policy $\pi^*_b$ that can minimize the estimation variance of the objective function has the following property:

$$q_{\pi^*_b}(x) \propto \frac{q^2_{\pi^*}(x)}{q_\pi(x)} \quad (14)$$

where $q_{\pi^*}(x)$ denotes the optimal importance sampling function that is unchanged during the training process, and the symbol $\alpha$ means "proportional to".

Theorem 2 finds that the optimal behavior policy is nearly inversely proportional to the target policy, particularly at the beginning of the training process when $q_\pi$ is far from $q_{\pi^*}$. When the optimal target policy has obtained, i.e., $q_\pi=q_{\pi^*}$, we will have $q_{\pi^*_b}=q_{\pi^*}$ according to Theorem 2. Theorem 2 indicates that, if using on-policy learning mechanisms ($q_{\pi_b}=q_\pi$), the behavior policy would be far from optimal, which could mislead the training process and eventually cause the underestimation issues. For example, if a target policy misses an action that could lead to a likely accident, an on-policy learning mechanism will never find this missing accident. More importantly, the on-policy mechanism could mislead the policy for purposely hiding the accidents that are difficult to evaluate, leading to the severe underestimation issue of the safety performance evaluation.

An off-policy learning mechanism may be used to address this issue, where a generic behavior policy is designed and kept unchanged during the training process. Specifically, a constant probability of the adversarial maneuver of the POV (i.e., $\varepsilon_{\pi_b}=0.01$) is determined and other maneuvers conducted with the total probability of 0.99 that were normalized according to the naturalistic distribution. This policy explores the state-action space using the naturalistic distribution most of the time and exploits the information of the model-based criticality measure that helps identify the POV and adversarial maneuver. It is noted that although the optimal behavior policy may need to be adaptively determined based on the target policy, as indicated in Theorem 2, an off-policy learning mechanism can provide a sufficiently good foundation for effective learning in this study. The behavior policy is also not sensitive to the constant of $\varepsilon_{\pi_b}$, and generally, a large value (e.g., 0.9, 0.95, 0.99, etc.) that balances the exploration and exploitation would be effective in this study.

shows that virtual traffic information is sent to the real vehicles. In at least some embodiments, the virtual traffic information includes information pertaining to one or more BVs, and may include one or more virtual or simulated basic safety messages (sBSMs), such as the sBSMs described in paragraphs [0011], [0019], [0033], [0062], and [0081]-[0086] of U.S. Patent Application Publication No. 2020/0065443, which is hereby incorporated by reference.

Figure 17:
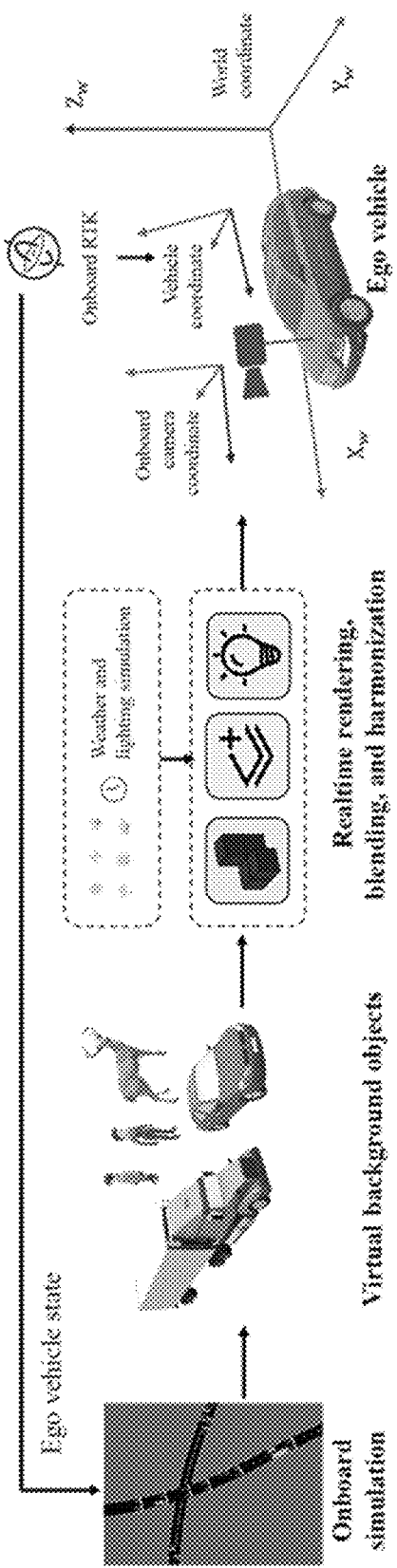
FIG. 17 is a flowchart of processing carried out by an image augmented reality (AR) module.
Figure 18:
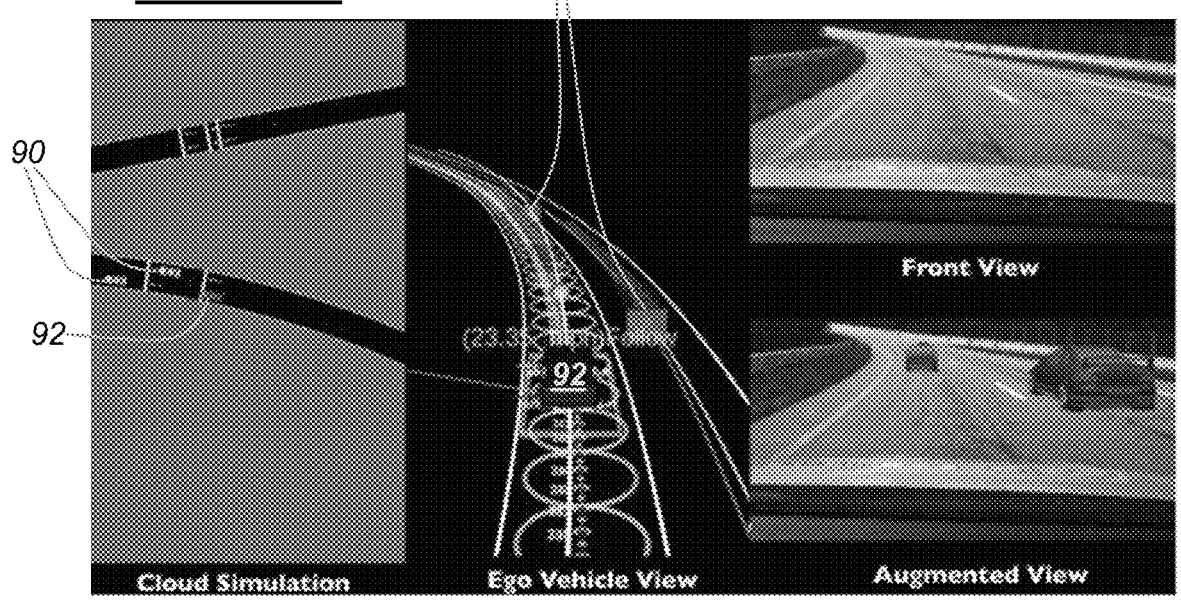
FIG. 18 shows an illustration of a real-time visualization of a testing process.

The system was implemented at American Center for Mobility (ACM) with an average 32.60 ms communication delay, which is acceptable for the AV testing. To enable test camera-based perception and localization systems, an image augmented reality module was developed and this module can superimpose virtual BVs into real camera videos in real-time, as shown in FIG. 17. FIG. 18 illustrates the real-time visualization of the testing process, and more details can be found in Supplementary Movie 2 and 3. In FIG. 18, the leftmost graphic illustrates the simulation view, where the virtual BVs 90 are generated and controlled by the intelligent testing environment to interact with a host AV 92; the middle graphic illustrates the real-world AV view visualized by the Autoware, with the host AV 92 (or AV under

TABLE 1

|  |  | 400 m | | 2 km | | 4 km | | 25 km |
| --- | --- | --- | --- | --- | --- | --- | --- | --- |
|  |  | 2 Lanes | 3 Lanes | 2 Lanes | 3 Lanes | 2 Lanes | 3 Lanes | 3 Lanes |
| NDE | No. of tests | $1.9 \times 10^8$ | $1.0 \times 10^8$ | $4.2 \times 10^7$ | $2.1 \times 10^7$ | $3.0 \times 10^7$ | $9.0 \times 10^6$ | $2.0 \times 10^6$ |
| D2RL | Episodes skipped | 95.70% | 91.73% | 77.54% | 79.85% | 61.42% | 58.92% | 8.83% |
|  | Steps skipped | 99.78% | 99.70% | 99.82% | 99.81% | 99.79% | 99.74% | 99.76% |
|  | No. of tests | $1.7 \times 10^5$ | $1.6 \times 10^5$ | $1.0 \times 10^5$ | $3.0 \times 10^4$ | $4.4 \times 10^4$ | $2.3 \times 10^4$ | $6.7 \times 10^3$ |
|  | No. of tests reduced | 99.91% | 99.84% | 99.76% | 99.86% | 99.85% | 99.74% | 99.67% |

Figure 15:
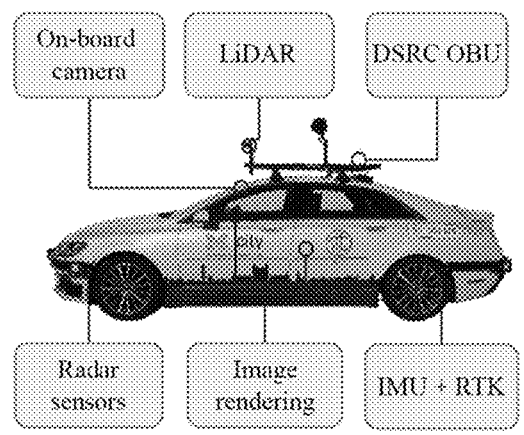
FIG. 15 shows an exemplary host AV that can be tested, and may be referred to as an AV under test.

The effectiveness of the disclosed D2RL approach, according to one embodiment, was demonstrated by testing a Lincoln™ MKZ™ hybrid, which was equipped with the open-source automated driving system, Autoware (27), and various sensors as shown in FIG. 15 in the physical multi-lane 4-km highway test track at ACM. We aimed to drive the AV continuously on the highway loop and evaluated its accident rate. In FIG. 15, "RTK" stands for real-time kinematic positioning; "IMU" stands for inertial measurement unit; "DSRC" stands for dedicated short-range communications; and "OBU" stands for on-board unit. To test the AV with the intelligent testing environment, we developed an augmented reality testing platform (28), which combined the physical test track and a simulation environment, SUMO (29).

Figure 16:
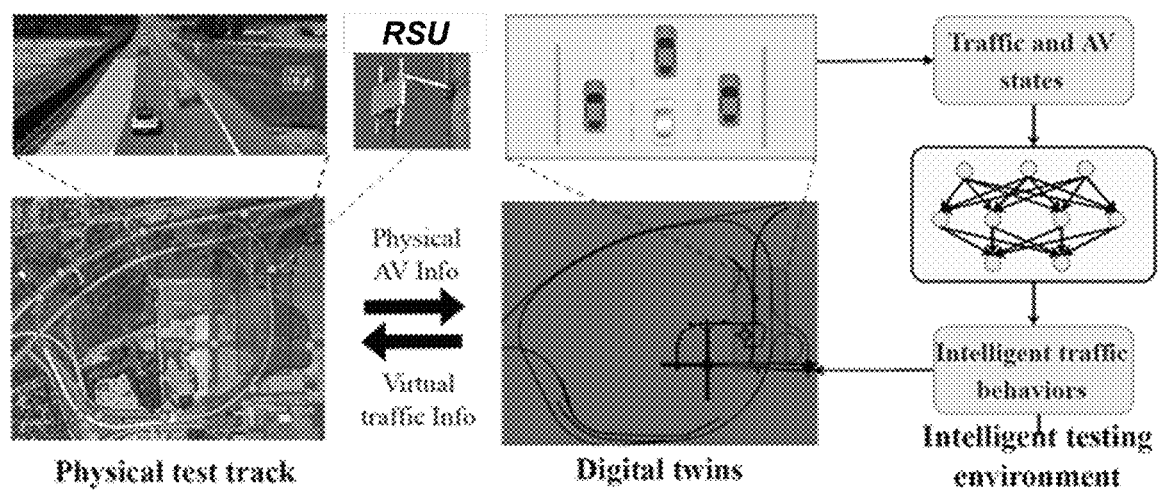
FIG. 16 shows a diagram illustrating synchronization between real AVs, such as a host AV, and virtual background vehicles (BVs)

As shown in FIG. 16, by synchronizing the movements of the real AV and virtual BVs, the real AV in the physical test track can interact with the virtual BVs as if it is in a realistic traffic environment, where the BVs are controlled to react with the real AV according to the intelligent testing environment. An AV testing system, which may be configured to use the disclosed D2RL approach for determining actions, such as maneuvers, for one or more BVs, may receive traffic state and connected vehicle state information from the environment in which the AV is being tested. For example, as shown in FIG. 16, traffic and AV states may be input into a neural network for determining intelligent traffic behaviors, which may refer to determined actions of the BVs that are made using the neural network. As discussed herein, the disclosed D2RL approach may be implemented using DRL techniques, including using a DRL agent trained using a D2RL approach (e.g., the disclosed D2RL approach), which is referred to herein as a trained D2RL agent. FIG. 16 also test) and the virtual or augmented BVs 90; and the rightmost images illustrate the original image view (top) and augmented image view (bottom) from the front camera of the host AV 92.

Figure 19A:
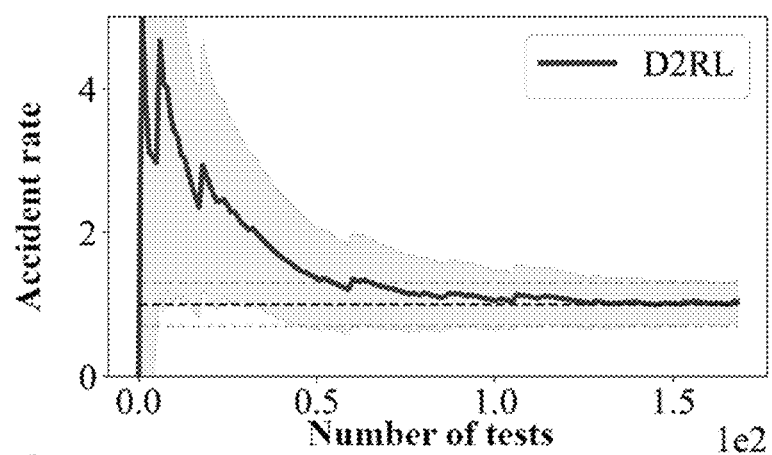
FIG. 19A shows a graph of accident rate estimation of the real AV at the physical test track with the AR testing platform.
Figure 19B:
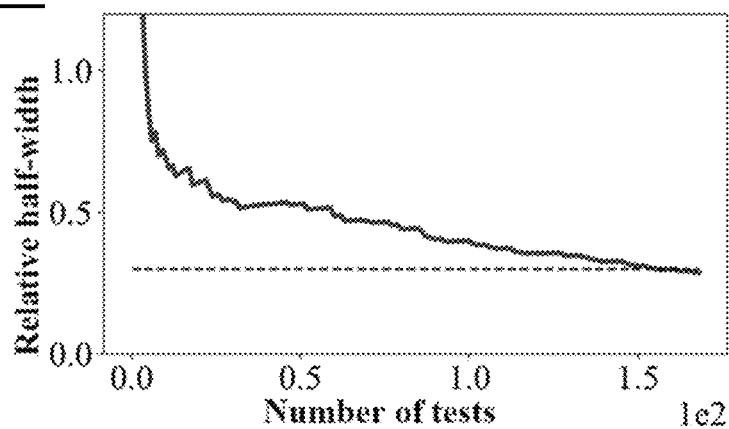
FIG. 19B shows a graph of the relative half-width of the real AV at the physical test track with the AR testing platform.

The intelligent testing environment in the digital twins of the ACM highway was trained with the same training settings as the simulation studies. However, as shown in Table 1, although the intelligent testing environment can accelerate the AV testing from about $10^8$ loops of tests to only about $4.4 \times 10^4$ loops, it is still a significant time to be conducted by an academic research group. To demonstrate the disclosed D2RL approach in a more efficient way, the NDE was simplified without loss of generalization, the intelligent testing environment was trained accordingly, and the host AV was tested. FIG. 19A shows a graph of accident rate estimation of the real AV at the physical test track with the augmented reality testing platform. FIG. 19B shows a graph of the relative half-width of the real AV at the physical test track with the augmented reality testing platform. The black dashed line (FIG. 19A) represents the final estimation of the accident rate, the light dashed line (FIG. 19A) represents the 0.3 relative half-width threshold, and the light shadow represents the 90% confidence level As shown in FIGS. 17 and 19B, the estimation of the accident rate converges and reaches the 30% relative half-width after about 161 tests, which is significantly smaller than that ($2.5 \times 10^7$) of the NDE method.

The results present evidence of using DRL techniques to validate AVs' safety performance, which opens the door for leveraging AI techniques for validating machine intelligence of safety-critical autonomous systems. The dense learning approach can enable AI techniques for a wide range of safety-critical applications with high-dimensional variables, simultaneously overcoming the "curse of dimensionality" and the "curse of rarity." It can significantly enhance existing testing methods (e.g., falsification, formal methods, and scenario testing) to overcome their limitations towards real-world applications. In a study, the effectiveness of the dense learning or D2RL approach was demonstrated for falsification involving multiple vehicles' adversarial maneuvers and scenario testing for complex trip-level driving environments in a high time resolution, tasks that existing methods cannot handle. The modeling of the intelligent testing environment generation provides a foundation for future AI-based studies of machine intelligence validation. The intelligent testing environment can be used to enhance the existing life-like simulations to accelerate the testing and training process of AVs. The corner cases can also be used for further development of AVs. With realistic NDE models, the disclosed D2RL approach can convert each test mile in test tracks approximately into equivalent hundreds or even thousands of driving miles on public roads, which can significantly accelerate the testing process of AVs. The entire framework may also be applied to the machine intelligence validation of other safety-critical autonomous systems with similar features.

Densifying the information is used to overcome the challenges caused by the rarity. In the field of deep neural networks, connecting different layers of neural networks more densely has been demonstrated with better training efficiency and efficacy, i.e., DenseNet (41). Instead of connecting layers of neural networks, the disclosed D2RL approach densifies the information by connecting states more densely with safety-critical states, besides the natural connections provided by the state transitions. As safety-critical states have more connections with rare events, they have more valuable information. By densifying the connections between safety-critical states with other states, the valuable information can be better propagated to the entire state space, which can significantly facilitate the learning process. According to one embodiment, uncritical states may be approximately identified and the remaining states are connected directly. According to some embodiments, this can be further improved by more flexible and dense connections, such as between safety-critical states and uncritical states, as the identified uncritical states may not be strictly uncritical. The connections can even be added in the form of curriculum learning (42), which can guide the information propagation gradually. The measures for identifying critical states can also be further improved by involving more advanced modeling techniques.

An augmented reality testing platform may be used as, at least according to some embodiments, it provides a promising way for testing physical AVs safely, precisely, and efficiently. This framework, including the disclosed D2RL approach, can also be applied for testing generic safety-critical autonomous systems. As the trustworthiness of testing results depends on the fidelity of NDE models in digital twins, it may be critical to construct the NDE models with statistical and interactive realism, which can be further improved by leveraging high-resolution large-scale naturalistic driving data. To further enable testing the LiDAR and radar-based functions, we will also develop the functions to augment these sensors' data. The platform also provides a promising environment for training the AVs, which will be further investigated. This may create a symbiotic relationship between the testing and training of safety-critical autonomous systems, accelerating both fields.

Simulation settings. Below is a discussion of a naturalistic driving environment (NDE) simulator that may be used as a part of the AV testing system discussed herein, at least according to one embodiment.

Figure 20:
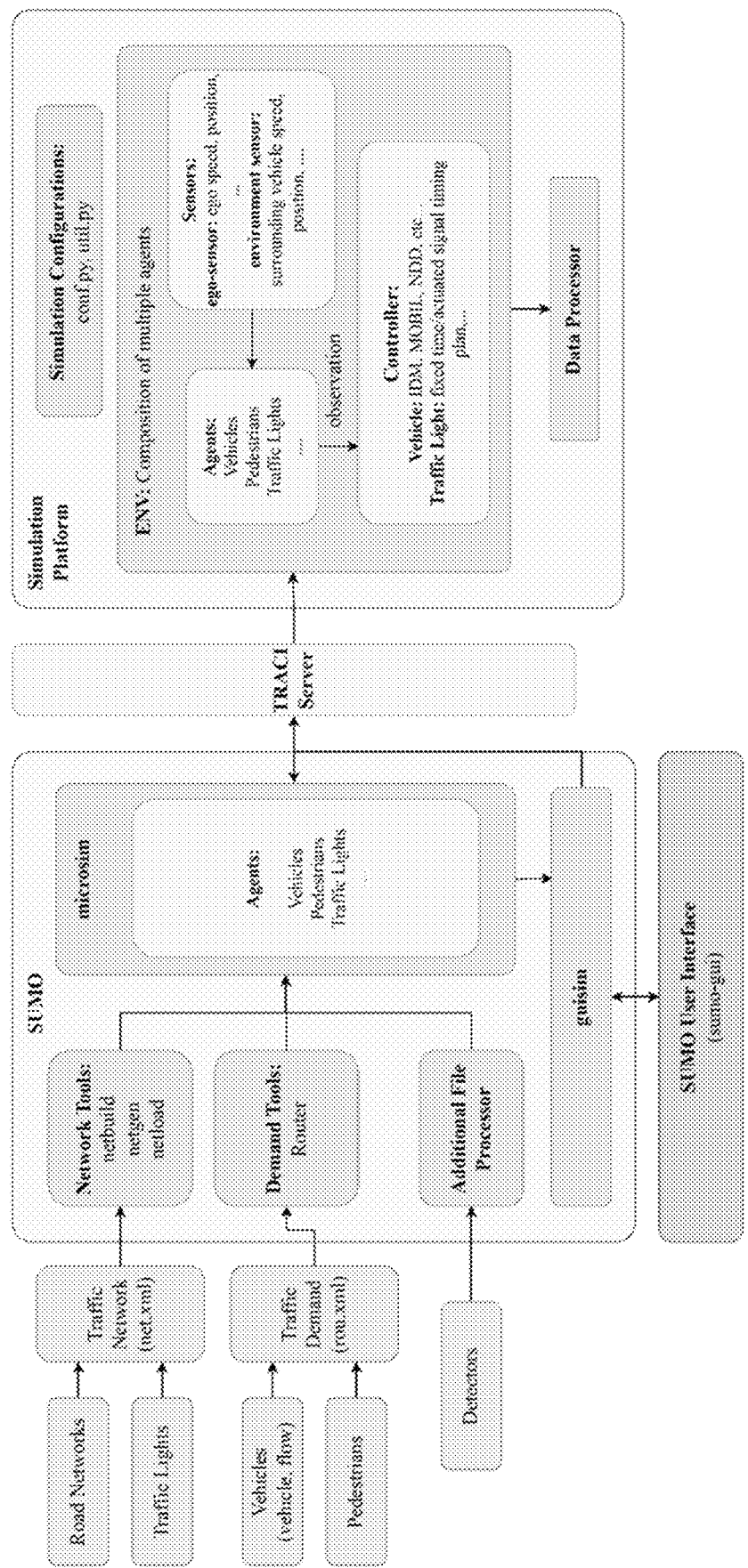
FIG. 20 shows an exemplary simulation platform that is used, according to one embodiment.

Naturalistic driving environment simulator. To construct the digital twins for the training and testing, a simulation platform was developed based on an open-source traffic simulator SUMO and an open-source vehicle simulator CARLA, in which the strengths of these simulators were combined, and this significantly extended their compatibility with high-fidelity driving environments, including the naturalistic driving environment and the intelligent testing environment. An exemplary simulation platform that was used is shown in FIG. 20. SUMO can provide convenient ways for scalable network construction, multimodal traffic, traffic demand models, and traffic management, while CARLA can implement high-fidelity vehicle dynamics, diverse sensor models, high-definition maps, and integration interfaces with high-fidelity automated driving systems such as Autoware. Both the C++ and TRACI interfaces were utilized to refine the SUMO simulator so that the high-fidelity driving environments can be integrated, and CARLA can be synchronized. Specifically, the C++ codes of SUMO to integrate the high-fidelity driving environments, including car-following and lane-changing behavior models, were rewritten and recompiled. Then, the TRACI interface was utilized to implement the intelligent testing environment, where at selected moments, selected vehicles would execute specific adversarial movers, following the policy modeled by neural networks. The modified SUMO and CARLA simulators were synchronized regarding the information of background vehicles, autonomous vehicles, traffic signals, high-definition maps, etc., through the TRACI interface.

Naturalistic driving environment models. In this study, naturalistic driving environment (NDE) models were constructed to provide naturalistic behaviors of BVs according to the large-scale naturalistic driving datasets (NDD) from the Safety Pilot Model Deployment program (30) and the Integrated Vehicle-Based Safety System program (31) at the University of Michigan, Ann Arbor. About $2.95 \times 10^8$ data points that were approximately 8,200 driving hours were queried to construct NDE models. Given a state encoding information of current traffic, the NDE models can provide distributions of each BV's maneuvers, which are consistent with NDD. Then, by sampling maneuvers from the distributions, a testing environment that can represent the real-world safety performance can be generated. More details of the NDE modeling method can be found in (45). For the field testing at ACM, the NDE models were simplified to demonstrate our method more efficiently because a simpler NDE usually requires a smaller number of tests in the intelligent testing environment. Specifically, the intelligent driving model (IDM) (39) and the MOBIL (Minimizing Overall Braking Induced by Lane change) model (40) were modeled as stochastic models and these models were utilized as the simplified NDE models.

Figure 21:
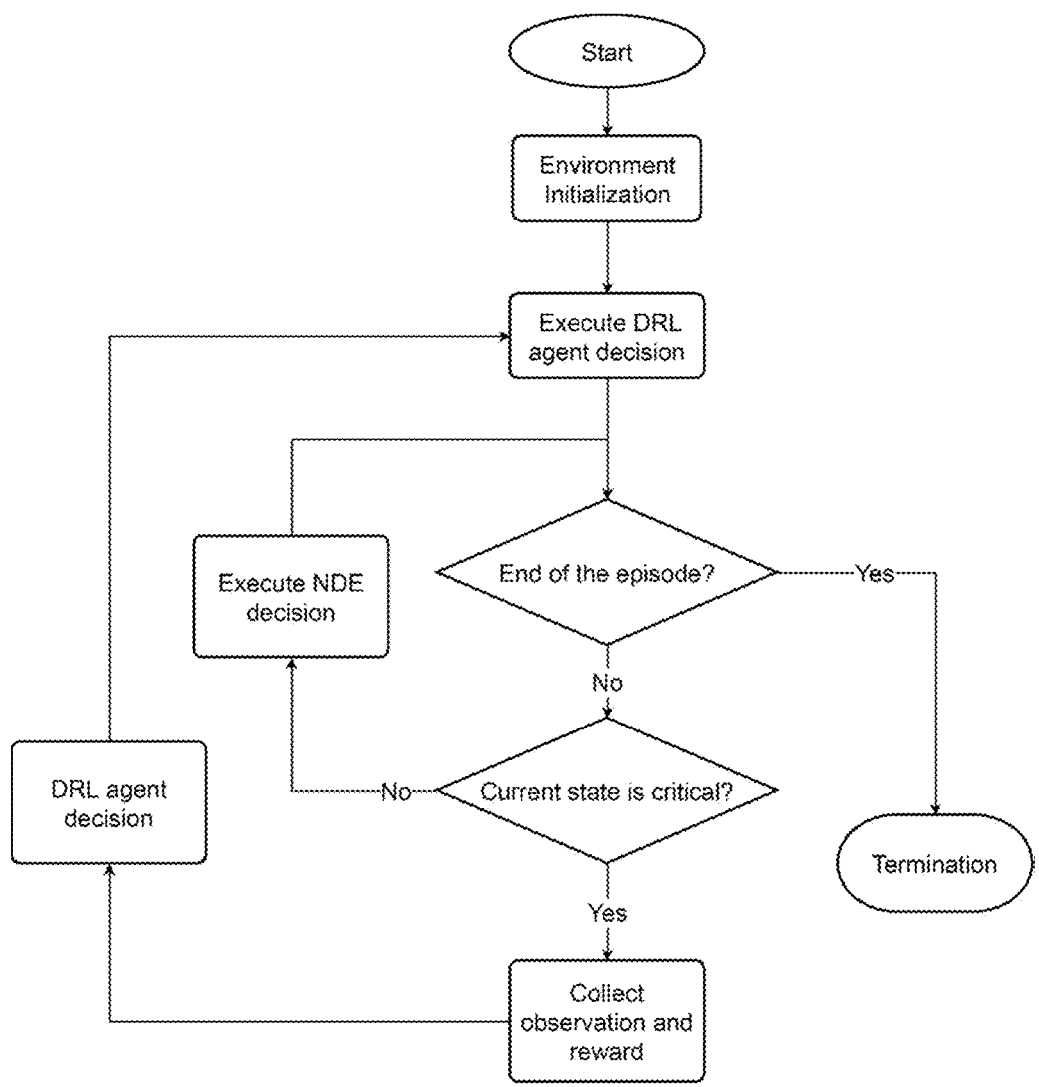
FIG. 21 is a flowchart of a method of implementing the disclosed D2RL approach using an adapted or modified DRL approach, according to one embodiment.

D2RL architecture, implementation, and training. The D2RL algorithm can be easily plugged into current DRL algorithms by defining a specific environment with the dense learning approach. Specifically, for the current DRL algorithms, the environment receives a decision from a DRL agent, executes the decision, and then collects observations and rewards at each time step, while for the D2RL algorithm, the environment only collects the observations and rewards for the critical states, as illustrated in FIG. 21. In this way, the D2RL approach may be implemented using existing DRL platforms. In this study, the PPO algorithm implemented at the RLLib 1.2.0 platform (38), which was parallelly trained on 500 CPU cores and 3500 GB memory high-performance computation cluster at the University of Michigan, Ann Arbor, was utilized. A 3-layer fully connected neural network was designed, with 256 neurons in each layer and chose the $10^{-4}$ learning rate and 1.0 discount factor besides the default parameters. Each CPU collected 120 timesteps of training data for all experiment settings in each training iteration, so a total of 60,000 timesteps were collected in each training iteration. To provide a training environment, a multi-lane highway driving environment was constructed on the naturalistic driving environment simulator, where each vehicle was controlled at every 0.1 seconds with the 33 discrete action space: left lane change, 31 discrete longitudinal accelerations ([−4, 2] with 0.2 m s$^{-2}$ discrete resolution), and right lane change. For the corner case generation, the neural network's output is the actions of the closest eight BVs, where each BV has the above 33 discrete action space. For the intelligent testing environment generation, the neural network's output is the adversarial maneuver probability ($\varepsilon_\pi$) of the POV, where action space is discretized as 0.1, 0.2, ..., 0.9, 0.91, 0.92, ..., 0.99, 0.995, 0.999. The generalization to a continuous action space is straightforward.

Field test settings. The following provides exemplary field testing settings and related discussion according to one embodiment and implementation.

Figure 22:
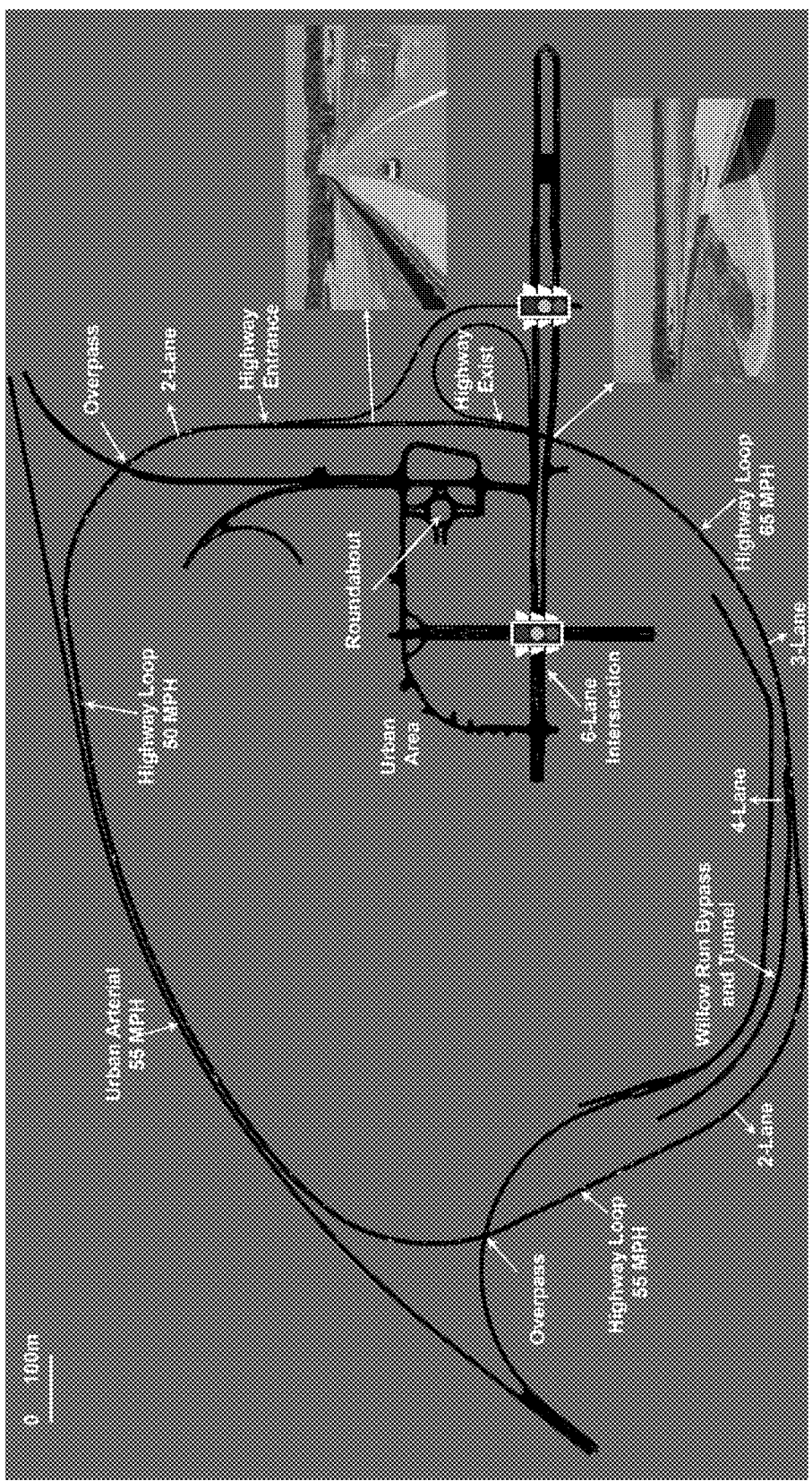
FIG. 22 is an illustration of the highway test track at the American Center for Mobility (ACM) that may be used for safety testing a host AV, according to one embodiment.

Augmented reality testing platform. The augmented reality testing platform was implemented at American Center for Mobility (ACM), a closed CAV testing facility located in Ypsilanti, MI. In this study, the 4 km highway loop was utilized, and this loop feature two-three lanes and both exit and entrance ramp to create various merging opportunities, as shown in FIG. 22. The digital twins of the ACM based on the naturalistic driving simulator and the high-definition map were constructed. To synchronize the information between the simulation and physical test track, 12 Siemens dedicated short-range communications (DSRC) roadside units (RSUs) that were installed along the highway loop were utilized. These DSRC devices can communicate with AVs on the highway via 802.11p and SAE J2735 protocols through the immediate forward messaging (IMF) and forwarding functions. Specifically, the IMF function was utilized to broadcast proxy Basic Safety Message (BSMs) containing virtual background vehicles' identifier, latitude, longitude, altitude, etc., to the physical AV and the forward function to forward incoming BSMs of the AV to the digital twins. After receiving the BSMs of the AV, the AV states in the simulation world were synchronized, where background vehicles were controlled by the intelligent testing environment.

Augmented image rendering. Augmented reality was adopted to render and blend virtual objects (e.g., vehicles) onto the camera view of the ego vehicle. Given a background 3D model with its 6 DoF pose/location in the world coordinate, we perform a two-stage transformation to project the model to the onboard camera (FIG. 17): 1) from the world coordinate to the ego-vehicle coordinate, and 2) from the ego-vehicle coordinate to the onboard camera coordinate. In the first transformation, the ego vehicle pose and location are obtained from the real-time signal of the onboard high-precision RTK. In the second transformation, the projection is based on the pre-calibrated camera intrinsic and extrinsic. Relighting on the rendered layer is performed to harmonize the visual quality of the blending result. The augmented view is generated based on a linear blending with the rendered foreground layer, camera's background layer, and the rendered alpha matte. On top of the blending result, a weather-control layer is further added to simulate different weather conditions, e.g., rain, snow, and fog. The augmented rendering is implemented based on pyrender (46). The 3D model assets are selected from the ShapeNet Dataset.

Figure 23:
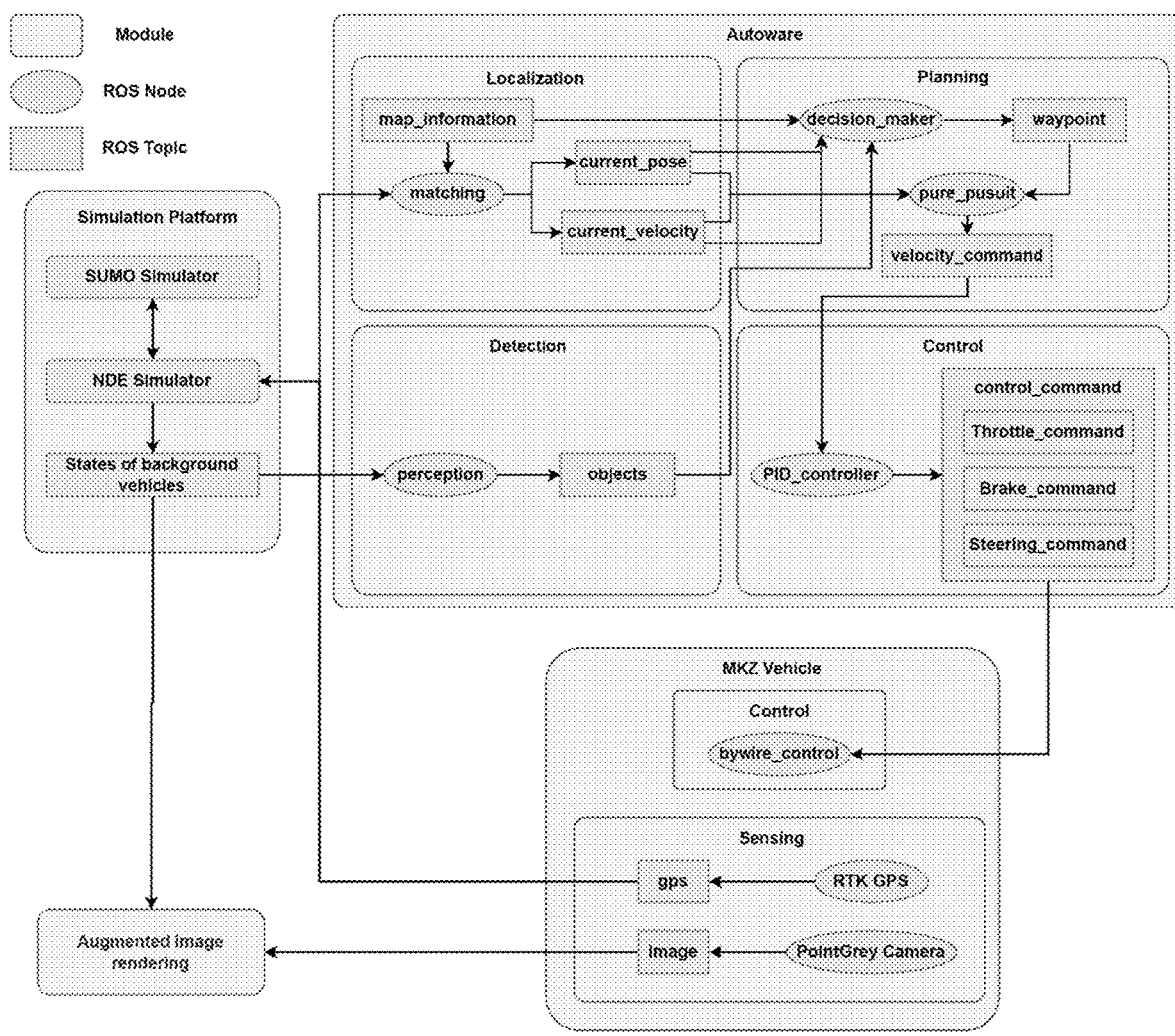
FIG. 23 depicts a system framework that may be used to implement the AV testing system and the method of safety testing the host AV, according to one embodiment.

Autonomous vehicle. As the host AV or AV under test, a retrofitted Lincoln™ MKZ™ from the Mcity™ test facility at the University of Michigan, Ann Arbor, which was equipped with multiple sensors, computing resources (2 Nexcom™ Lumina™), and with drive-by-wire capabilities provided by Dataspeed™ Inc. Specifically, the sensors include PointGrey™ camera, Velodyne™ 32 channel LiDAR, Delphi™ radars, OTXS R13003 RTK GPS, Xsens MTi™ GPS/IMU, etc. The host AV was implemented with a ROS-based open-source software, Autoware.AI (27), which provides full-stack software for the highly automated driving functions, including localization, perception, planning, control, etc. Then, the host AV was integrated with the AR testing platform to evaluate the AV's safety performance. An illustration of the system framework, according to one embodiment, is shown in FIG. 23. Specifically, the AV localization component was modified to utilize the high-definition map and high-accuracy RTK for obtaining the current pose and velocity. The surrounding vehicles' BSMs were directly obtained from the simulation through wireless communications. To generate the AV's future trajectory, the OpenPlanner™ 1.13 (47) was applied as the decision module, an advanced planning algorithm including global and local path planning. The pure pursuit algorithm was applied to convert the planned trajectory into the velocity and yaw rate and then used a PID controller provided by Dataspeed™ Inc. to further convert them into the vehicle by-wire control commands, i.e., steering angle, throttle, and brake percentages.

Figure 24:
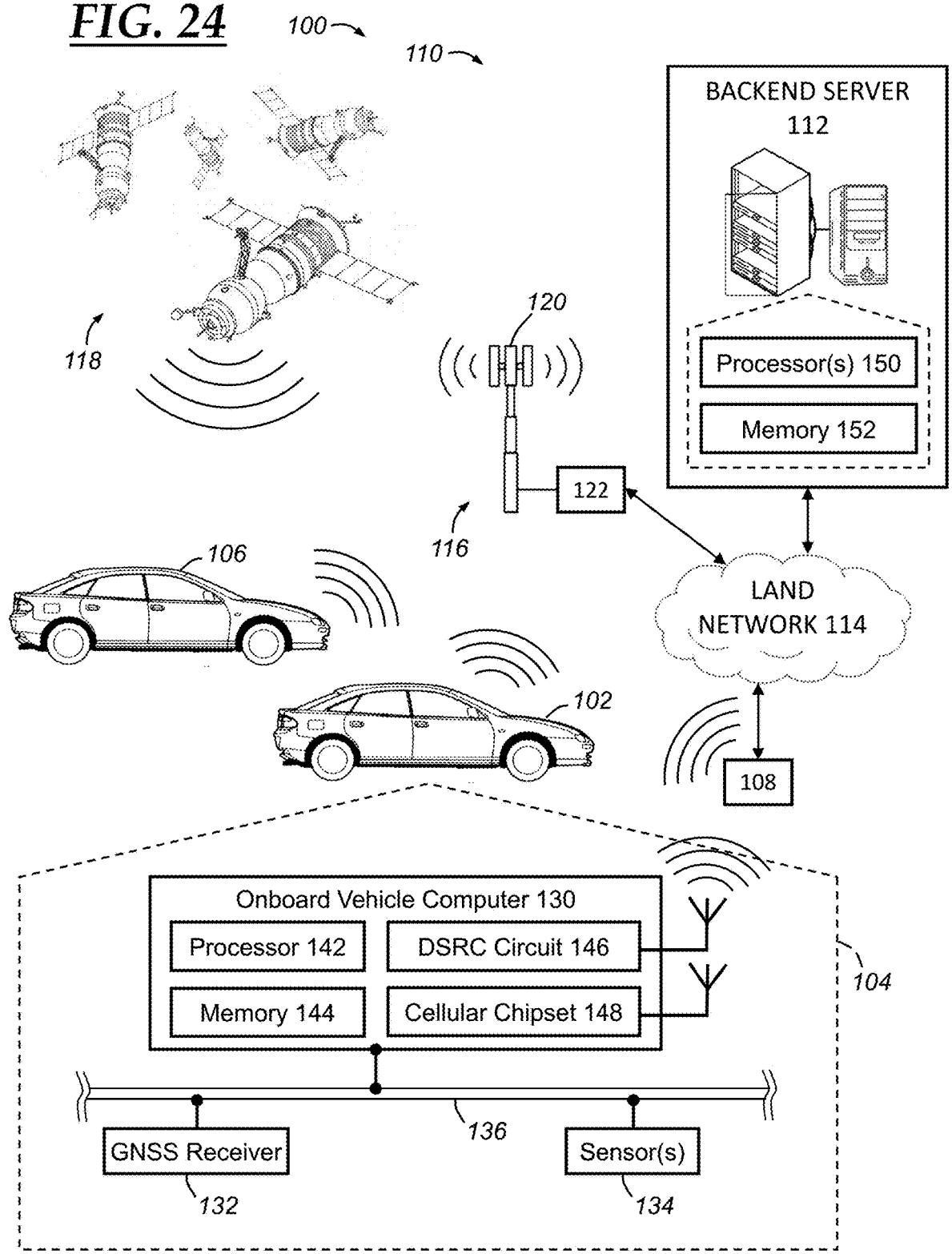
FIG. 24 depicts a communications system having an AV testing system and a host AV, where the AV testing system may be configured to carry out the method disclosed herein, according to one embodiment.

With reference now to FIG. 24, there is shown an operating environment that comprises a communications system 100, a host autonomous vehicle (AV) 102 having vehicle electronics 104, a real background vehicle (BV) 106, roadside unit(s) 108, a backend server 112, a land network 114, a wireless carrier system 116, and a constellation of global navigation satellite system (GNSS) satellites 118. The communications system 100 includes an AV testing system 110 that is comprised of at least one processor and memory coupled to the at least one processor, as is discussed more below. In certain embodiments, the real BV 106 may be omitted, such as where all of the BVs used for testing are virtual BVs. As used herein, a real BV is a BV that is a real, physical vehicle and a virtual BV is a BV that is simulated using a computer simulation. It should be appreciated that while the illustrated embodiment of FIG. 24 provides an example of one such communications system 100, the system and method described below may be used as part of various other communications systems.

The land network 114 may be a conventional land-based telecommunications network that is connected to one or more landline telephones and connects the wireless carrier system 116 to the backend server 112. For example, the land network 114 may include a public switched telephone network (PSTN) such as that used to provide hardwired telephony, packet-switched data communications, and the Internet infrastructure. One or more segments of the land network 114 may be implemented through the use of a standard wired network, a fiber or other optical network, a cable network, power lines, other wireless networks such as wireless local area networks (WLANs), or networks providing broadband wireless access (BWA), or any combination thereof.

The wireless carrier system 116 may be any suitable long-range data transmission system, such as a cellular telephone system. The wireless carrier system 116 is shown as including a single cellular tower 120; however, the wireless carrier system 116 may include additional cellular towers as well as one or more of the following components, which may depend on the cellular technology being used: base transceiver stations, mobile switching centers, base station controllers, evolved nodes (e.g., eNodeBs), mobility management entities (MMEs), serving and PGN gateways, etc., as well as any other networking components used to connect the wireless carrier system 116 with the land network 114 or to connect the wireless carrier system 116 with user equipment (UEs, e.g., which may include telematics equipment in the host AV 102 or the real BV 106), all of which is indicated generally at 122. The wireless carrier system 116 may implement any suitable communications technology, including for example GSM/GPRS technology, CDMA or CDMA2000 technology, LTE technology, 5G, etc. In at least one embodiment, the wireless carrier system 116 implements 5G cellular communication technology and includes suitable hardware and configuration. In some such embodiments, the wireless carrier system 116 provides a 5G network usable by the host AV 102 and/or real BV 106 for communicating with the backend server 112 or other computer/device remotely located from the host AV 102 and/or real BV 106. In general, the wireless carrier system 116, its components, the arrangement of its components, the interaction between the components, etc. is generally known in the art.

The backend server 112 may be used to provide a backend for one or more components of the host AV 102 and/or real BV 106, such as for purposes of receiving data from the vehicles 102,106 for purposes of carrying out the method 200 (FIG. 25) below and/or for other purposes, such as for sending over-the-air (OTA) updates to the vehicles 102,106. In at least one embodiment, the backend server 112 includes one or more computers or computing devices (collectively, "computers"). In some embodiments, the backend server 112 is used to store information pertaining to the vehicles 102,106, such as vehicle state information that may be used to evaluate performance of the host AV 102. The backend server 112 is a server that is carried out or hosted by one or more computers, each of which includes a processor and a non-transitory, computer-readable memory that is accessible by the processor. In at least one embodiment, the backend server 112 is used to provide configuration information (e.g., data, computer instructions) used as a part of AV testing of the host AV 102. The configuration information may be used to direct actions of one or more BVs that are present during testing of the host AV 102. In some embodiments, the configuration information causes a BV to operate according to a trained machine learning (ML) agent, as discussed below, which may be a trained D2RL agent. The configuration information may be used by a simulator that simulates the BV(s) and/or their actions/movements. In one embodiment, the ML agent is trained using the disclosed D2RL approach and then this trained D2RL agent is used for determining actions of one or more BVs that are present during testing of the host AV 102. The training of the ML agent, including the editing of the Markov decision process (MDP), which is discussed in more detail below, may be carried out by the backend server 112.

It will be appreciated that the backend server 112 may actually include a plurality of servers that may be collocated or remotely located from one another, and that may be used for a variety of services. In some embodiments, one or more steps or functions described herein as being carried out by the backend server 112 may be carried out by cloud computing services and the actual processing may be carried out in a distributed manner. It should be appreciated, however, that the backend server 112, which is remote from the host AV 102, may be implemented in a variety of ways and is not to be limited to any particular configuration, type, or number of computing devices.

The backend server 112 is shown as including one or more processors 150 and non-transitory, computer-readable memory 152. In some embodiments, the backend server 112 may be configured so that, when computer instructions stored on the memory 152 are executed by the processor(s) 150, the backend server 112 causes certain steps and/or functionality to be carried out, such as any of the functionality attributed to the backend server 112 as discussed herein. The backend server 112 may be used for various purposes, such as to provide the vehicle information concerning the roadway on which it is operating and/or other information concerning the vehicle's environment. In some embodiments, the communications system 100 includes various backend servers that are used for various purposes.

In at least one embodiment, the backend server 112 is used to carry out one or more steps of the method 200 (FIG. 25) described below. For example, in one embodiment, the memory 152 stores computer instructions that, when executed by the at least one processor 150, cause one or more steps of the method 200 (FIG. 25) to be carried out. And, as mentioned above, the backend server 112 may be comprised of various computing devices that may be co-located or remotely located from one another. In one embodiment, a first computer subsystem of the backend server 112 may be used to carry out the Markov decision process editing step herein and another computer subsystem of the backend server 112 may be used to train a neural network using the edited Markov decision process. Then, for example, a third computer subsystem may be used to execute a ML agent for purposes of controlling operation of one or more BVs, such as the real BV 106 and virtual BV(s). In other embodiments, however, such steps or functions may be carried out by the same computing devices or computer subsystem or by other components of the communications system 100.

The host AV 102 is depicted in the illustrated embodiment as a passenger car, but it will be appreciated that any other vehicle including motorcycles, trucks, sports utility vehicles (SUVs), recreational vehicles (RVs), other vehicles or mobility devices that can be used on a roadway or sidewalk, etc., can also be used. As depicted in the illustrated embodiment, the host AV 102 includes the vehicle electronics 104. The vehicle electronics 104 include an onboard vehicle computer 130, a GNSS receiver 132, one or more sensors 134, and a vehicle communications bus 136. FIG. 24 provides an example of certain components of the vehicle electronics 104; however, it will be appreciated that, according to various embodiments, the vehicle electronics 104 may include one or more other components in addition to or in lieu of those components depicted in FIG. 24.

The real background vehicle (BV) 106 is a real vehicle, like the host AV 12, and may include the same or similar hardware as that of the host AV 12. Each of the components of the host AV 102 are hereby attributed to the real BV 106. The real BV 106 may include a different configuration or operating instructions than the host AV 102, as the host AV is the AV under test and real BV 106 is a BV used for purposes of testing the host AV. The real BV 106 may be controlled at least in part by the method discussed herein, which may be based on the disclosed D2RL approach. In some embodiments, the AV testing system 110 includes using the real BV 106 to test the host AV 102. As mentioned above, the real BV 106 is omitted, at least in some embodiments.

With reference back to the vehicle electronics 104 of the host AV 102, the global navigation satellite system (GNSS) receiver 132 receives radio signals from the constellation of GNSS satellites 118. The GNSS receiver 132 uses the received radio signals to generate location data that represents the location of the GNSS receiver 132 and, thus, the host AV 102 on which it is installed. In one embodiment, such as where the system 100 is within the United States, the GNSS receiver 132 may be a global positioning system (GPS) receiver. In another embodiment, such as where the system 10 is within Europe, the GNSS receiver 132 may be a GNSS receiver configured to be used with Galileo. In addition to the location data, which may represent a location as a geographical coordinate pair, the GNSS receiver 132 may also specify the time associated with each location. This time and location data that is obtained by a GNSS receiver based on GNSS signals is referred to as GNSS data. The location data may be used in conjunction with other data, such as map data that specifies attributes of roads, to identify information concerning the road on which the vehicle is travelling. As another example, the location data may be used to obtain weather information about the location at which the host AV 102 is located. The host AV 102 may also utilize RTK techniques, and may include a high-precision RTK module.

The one or more sensors 134 represent at least one onboard vehicle sensor that may be installed on the host AV 102 and used by the AV 102 for its autonomous operations and/or for obtaining data for testing or evaluation of the host AV 102. The sensor(s) 134 may include vehicle cameras, radar devices, lidar devices, ignition timing sensors, exhaust sensors, vehicle speed sensors, accelerometers, battery sensors, parking assist sensors, lane change and/or blind spot sensors, lane assist sensors, tire-pressure sensors, fluid level sensors (including a fuel level sensor), brake pad wear sensors, and rain or precipitation sensors. Generally, the sensor(s) 134 are used to obtain vehicle sensor data, which can include vehicle sensor values as measured or determined by the sensor. The sensor data from the sensor(s) 134 may be captured during testing and then evaluated as a part of evaluating the host AV 102 when under test.

The onboard vehicle computer 130 is an onboard computer in that it is carried by the host AV 102 and is considered a vehicle computer since it is a part of the vehicle electronics 104. The onboard vehicle computer 130 includes at least one processor 142 and non-transitory, computer-readable memory 144 that is accessible by the at least one processor 142. The onboard vehicle computer 130 is connected to the vehicle communications bus 136 and may send messages to, and receive messages from, other vehicle components using this bus 136. The onboard vehicle computer 130 also includes a short-range wireless communications (SRWC) or dedicated short range communication (DSRC) circuit 146 and a cellular chipset 148 that are used for wireless communications. The DSRC circuit 146 includes an antenna and is configured to carry out one or more SRWC technologies, such as any one or more of the IEEE 802.11 protocols (e.g., IEEE 802.11p, Wi-Fi™), WiMAX™, ZigBee™, Z-Wave™, Wi-Fi direct™, Bluetooth™ (e.g., Bluetooth™ Low Energy (BLE)), and/or near field communication (NFC). In one embodiment, the DSRC circuit 146 may be used to carry out communications with the backend server 112—for example, the host AV 102 may use the DSRC circuit 146 to send messages to roadside unit(s) (RSU(s)) 108, which may then forward the messages to the backend server 112 via land network 114 to which the RSU 108 is connected. The cellular chipset 148 includes an antenna and is used for carrying out cellular communications or long-range radio communications with the wireless carrier system 116. And, in one embodiment, the cellular chipset 148 includes suitable 5G hardware and 5G configuration so that 5G communications may be carried out between the host AV 102 and the wireless carrier system 116, such as for purposes of carrying out communications between the host AV 102 and one or more remote devices/computers, such as those implementing the backend server 112.

Any one or more of the processors discussed herein is an electronic processor that may be implemented as any suitable electronic hardware that is capable of processing computer instructions and may be selected based on the application in which it is to be used. Examples of types of processors that may be used include central processing units (CPUs), graphics processing units (GPUs), field-programmable gate arrays (FPGAs), application specific integrated circuits (ASICs), microprocessors, microcontrollers, etc. Any one or more of the memory or memory devices described herein is or includes non-transitory, computer-readable memory and may be implemented as any suitable type of memory that is capable of storing data or information in a non-volatile manner and in an electronic form so that the stored data or information is consumable by the processor. The memory may be any a variety of different electronic memory types and may be selected based on the application in which it is to be used. Examples of types of memory that may be used include including magnetic or optical disc drives, ROM (read-only memory), solid-state drives (SSDs) (including other solid-state storage such as solid state hybrid drives (SSHDs)), other types of flash memory, hard disk drives (HDDs), non-volatile random access memory (NVRAM), etc. It should be appreciated that any one or more of the computers discussed herein may include other memory, such as volatile RAM that is used by the processor, and/or multiple processors.

Figure 25:
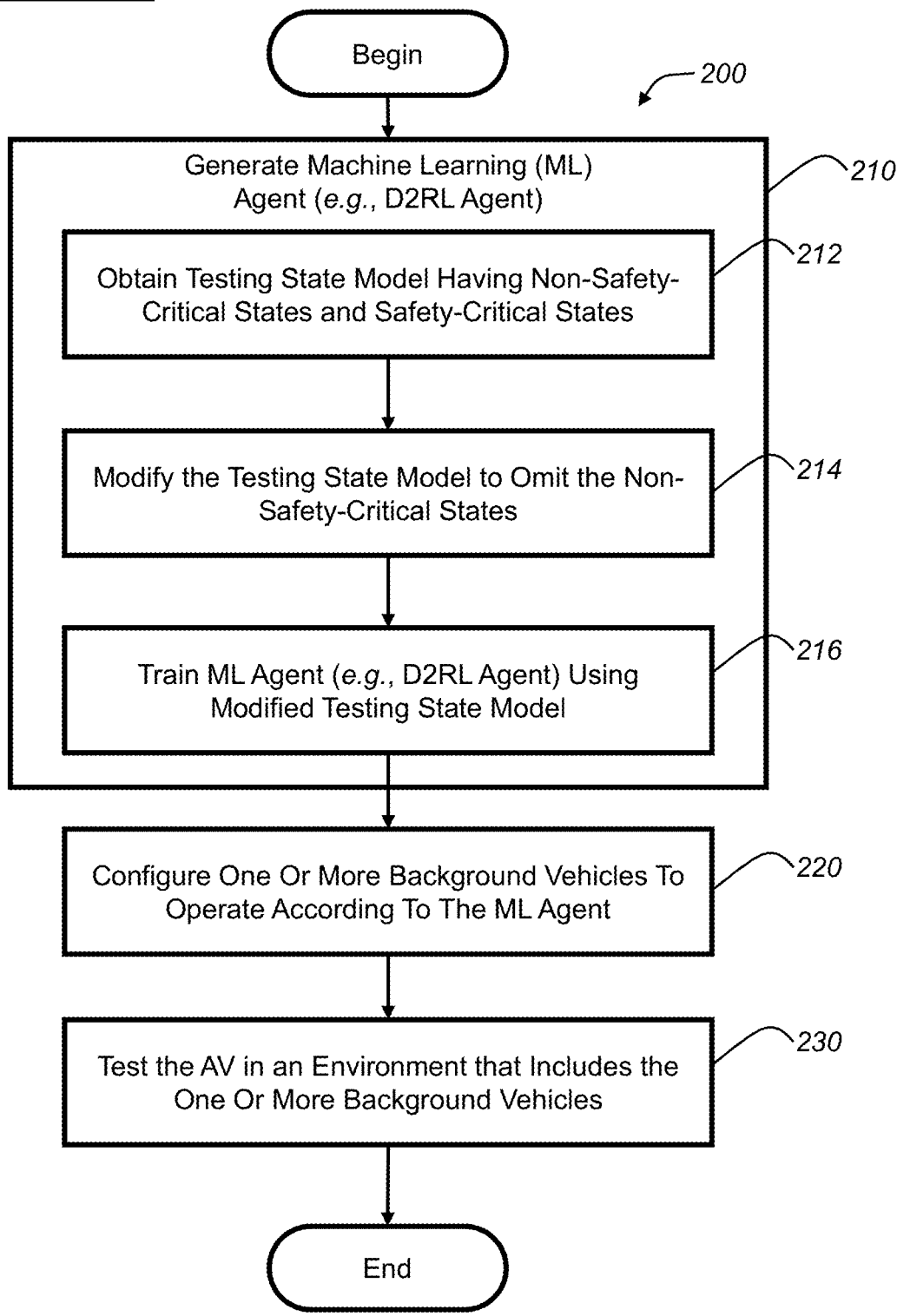
FIG. 25 is a flowchart of a method of safety testing a host AV, according to one embodiment.

With reference to FIG. 25, there is shown an embodiment of a method 200 of safety testing an AV and, according to at least some embodiments, the method 200 is implemented as a method of safety testing an AV in a naturalistic environment and/or a method of naturalistic safety testing an AV. The method 200, or one or more steps thereof (e.g., steps 210 and/or 220), may be carried out by the AV testing system 110. In such embodiments, the AV testing system 110 may include computer instructions stored on memory that, when executed by at least one processor, cause the associated steps and/or functionality to be carried out, such as that in steps 210 and 220. According to at least some embodiments, the AV testing system 110 is or includes portions, such as one or more processors and/or memory, of the backend server 112.

The method 200 begins with step 210, wherein a machine learning (ML) agent is generated. The machine learning agent, which may be a deep reinforcement learning (DRL) agent, for example, uses a policy that is modeled by an ML model, such as a neural network, for example. In the illustrated embodiment, generating the ML agent includes steps 212-216. In step 212, a testing state model is obtained that includes critical states and non-critical states. In at least one embodiment, the testing problem or environment is formulated or represented as or by a testing state model, such as a sequential MDP, where maneuvers of background vehicles (BVs) are decided based on the current states encoding information (e.g., position and speed) about the BVs and the host AV (or the AV under test) and, in this embodiment, the MDP is the testing state model. In other embodiments, the testing state model may be another model of the environment, such as a non-Markovian state-action model, and this model may be edited to remove the uncritical states. The method 200 proceeds to step 214.

In step 214, the testing state model is edited to omit or remove uncritical states. The uncritical states may refer to non-safety-critical states. In one embodiment, such as when the disclosed D2RL approach is used, the testing state model (e.g., MDP) may be edited so as to remove uncritical (or non-safety-critical) states and to reconnect critical (or safety-critical) states, such as is shown in FIG. 3. This testing state model as edited is referred to as an edited testing state model and the MDP as edited is referred to as an edited MDP. In some embodiments, such as where the disclosed D2RL approach is used, this step also includes or results in densifying information used as training data for training the ML agent in step 216. At least according to some embodiments, the system and method provided herein addresses the curse of rarity and/or curse of dimensionality, as discussed above, by implementing the disclosed D2RL approach in which a Markov decision process (or other testing state model) is edited by removing uncritical states and reconnecting critical states to one another so that the use of the information in the training data is densified. Thus, in such embodiments, the edited state testing model may also be referred to as a densified state testing model. The method 200 proceeds to step 216.

In step 216, a machine learning (ML) agent is trained using the edited state testing model. In at least some embodiments, the ML agent is a deep reinforcement learning (DRL) agent or a dense DRL (D2RL) agent, such as when the disclosed D2RL approach is used. The ML agent employs a ML model, such as a neural network, which is trained using the edited or densified state testing model. Since the uncritical data was removed as a part of removing the uncritical states, the data used for training is densified with respect to safety-critical data and, thus, this may overcome or mitigate the curse of rarity. In some embodiments employing the disclosed D2RL approach, background vehicles (BVs) are trained in the naturalistic driving environment simulator to learn when to execute a particular adversarial maneuver. For example, using the disclosed D2RL approach, according to at least one embodiment, BVs are trained in the naturalistic driving environment simulator to learn when to execute a particular adversarial maneuver, resulting in an intelligent testing environment that can maximize the evaluation efficiency while ensuring the estimation unbiasedness. As discussed above, this results in an intelligent testing environment that can maximize the evaluation efficiency while ensuring the estimation unbiasedness, at least according to some embodiments. The method 200 continues to step 220.

In step 220, one or more background vehicles are configured to operate according to the trained ML agent. The trained ML agent may be represented in the AV testing system 110 may be compiled into data, such as a set of parameters that were determined as a result of training, such as parameters of a neural network. In at least one embodiment, the trained ML agent is saved in the memory 152 of the backend server 112. In at least one embodiment where the BV(s) are or include a virtual BV, the simulation that will be used for testing may be configured to use the trained ML agent to select maneuvers and/or other operations for the BV(s) during testing. In at least one embodiment where the BV(s) are or include a virtual BV, the real BV(s) may be configured to receive a command or instruction from the trained ML agent, which may be configured to run as a part of the simulation at the backend server 112, at the real BV, and/or at another appropriate computing device, such as RSU 108. The method 200 continues to step 230.

In step 230, the host AV is tested in an environment that includes the one or more background vehicles. The host AV is tested in a testing environment, which is a predetermined or designated testing location for testing the host AV and which may be a closed track testing facility or one or more roads when performing an on-road test. According to at least one embodiment, the host AV is tested in an augmented reality (AR) manner in which the host AV operates in the real world, such as at a real testing environment (as opposed to a virtual testing environment), and where virtual elements are introduced into the host AV's environment through, for example, sending virtual or simulated BSMs from a roadside unit to the host AV, such as that which is described in U.S. Patent Application Publication No. 2020/0065443. Such a simulation system that provides an AR environment for testing AVs is referred to as an AR AV testing system.

In one embodiment, the simulation system described in U.S. Patent Application Publication No. 2020/0065443 may be used. This simulation system provides simulated virtual objects for use by a connected real vehicle (here, the host AV) during testing of the vehicle on a roadway. The discussion of the simulation system in paragraphs [0015]-[0021], [0047]-[0095] of U.S. Patent Application Publication No. 2020/0065443 as well as the method(s) discussed in paragraphs [0004]-[0014], [0022]-[0034], [0047]-[0049], and [0096]-[0106] of U.S. Patent Application Publication No. 2020/0065443 is hereby incorporated by reference. Such a simulation system may be used for testing the host AV in a real environment augmented by virtual vehicles (here, background vehicles) and, in particular, such a simulation system may be modified configured to include BVs that operate according to the trained ML agent. In this way, at least according to some embodiments, naturalistic safety testing may be performed on the host AV in a real environment, and in a way so as to address the above-described curse of rarity and curse of dimensionality. The method 200 then ends.

In other embodiments, the disclosed D2RL approach, one or more steps of the method 200, and/or other features described herein may be carried out for a virtual host AV, a real or virtual vehicle, or for other applications. It will be appreciated that the disclosed D2RL approach may be applied to other vehicle testing or product testing in general that suffers from like problems to those of the curse of rarity and curse of dimensionality, as described above.

It is to be understood that the foregoing description is of one or more embodiments of the invention. The invention is not limited to the particular embodiment(s) disclosed herein, but rather is defined solely by the claims below. Furthermore, the statements contained in the foregoing description relate to the disclosed embodiment(s) and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all of the following: "A"; "B"; "C"; "A and B"; "A and C"; "B and C"; and "A, B, and C."

REFERENCES

1. LeCun, Y., Bengio, Y., & Hinton, G. (2015). Deep learning. nature, 521(7553), 436-444.
2. Insider, 10 million self-driving cars will be on the road by 2020, https://www.businessinsider.com/report-10-million-self-driving-cars-will-be-on-the-road-by-2020-2015-5-6, 2016.
3. Nissan promises self-driving cars by 2020, https://www.wired.com/2013/08/nissan-autonomous-drive/, 2014.
4. Insider, Tesla's self-driving vehicles are not for off, https://www.businessinsider.com/elon-musk-on-teslas-autonomous-cars-2015-9, 2015.
5. Society of Automotive Engineers, Taxonomy and Definitions for Terms Related to Driving Automation Systems for On-Road Motor Vehicles, https://www.sae.org/standards/content/j3016_202104/, 2021.
6. Kalra, N., & Paddock, S. M. (2016). Driving to safety: How many miles of driving would it take to demonstrate autonomous vehicle reliability?. Transportation Research Part A: Policy and Practice, 94, 182-193.
7. California Department of Motor Vehicles, Disengagement reports, https://www.dmv.ca.gov/portal/vehicle-industry-services/autonomous-vehicles/disengagement-reports/, 2020.
8. Paz, D., Lai, P. J., Chan, N., Jiang, Y., & Christensen, H. I. (2020, September). Autonomous vehicle benchmarking using unbiased metrics. In 2020 IEEE/RSJ International Conference on Intelligent Robots and Systems (IROS) (pp. 6223-6228). IEEE.
9. Favaro, F., Eurich, S., & Nader, N. (2018). Autonomous vehicles' disengagements: Trends, triggers, and regulatory limitations. Accident Analysis & Prevention, 110, 136-148.
10. Donoho, D. L. (2000). High-dimensional data analysis: The curses and blessings of dimensionality. AMS math challenges lecture, 1(2000), 32.
11. Sutton, R. S., & Barto, A. G. (2018). Reinforcement learning: An introduction. MIT press.
12. Megahed, F. M., Chen, Y. J., Megahed, A., Ong, Y., Altman, N., & Krzywinski, M. (2021). The class imbalance problem. Nature Methods, 18(11), 1270-1272.
13. Hinton, G. E., & Salakhutdinov, R. R. (2006). Reducing the dimensionality of data with neural networks. science, 313(5786), 504-507.
14. Silver, D., Schrittwieser, J., Simonyan, K., Antonoglou, I., Huang, A., Guez, A., . . . & Hassabis, D. (2017). Mastering the game of go without human knowledge. nature, 550(7676), 354-359.
15. Mirhoseini, A., Goldie, A., Yazgan, M., Jiang, J. W., Songhori, E., Wang, S., . . . & Dean, J. (2021). A graph placement methodology for fast chip design. Nature, 594(7862), 207-212.
16. Koren, M., Alsaif, S., Lee, R., & Kochenderfer, M. J. (2018, June). Adaptive stress testing for autonomous vehicles. In 2018 IEEE Intelligent Vehicles Symposium (IV) (pp. 1-7). IEEE.
17. Pek, C., Manzinger, S., Koschi, M., & Althoff, M. (2020). Using online verification to prevent autonomous vehicles from causing accidents. Nature Machine Intelligence, 2(9), 518-528.
18. Katz, G., Barrett, C., Dill, D. L., Julian, K., & Kochenderfer, M. J. (2017, July). Reluplex: An efficient SMT solver for verifying deep neural networks. In International Conference on Computer Aided Verification (pp. 97-117). Springer, Cham.
19. Feng, S., Feng, Y., Yu, C., Zhang, Y., H. X. Liu. (2020). Testing scenario library generation for connected and automated vehicles, Part I: Methodology. IEEE Transactions on Intelligent Transportation Systems, 22(3), 1573-1582.
20. Feng, S., Y. Feng, H. Sun, S. Bao, Y. Zhang, H. X. Liu. (2020). Testing scenario library generation for connected and automated vehicles, Part II: Case studies. IEEE Transactions on Intelligent Transportation Systems, 22(9), 5635-5647.
21. Feng, S., Feng, Y., Sun, H., Zhang, Y., & Liu, H. X. (2020). Testing scenario library generation for connected and automated vehicles: an adaptive framework. IEEE Transactions on Intelligent Transportation Systems, 23(2), 1213-1222.
22. Feng, S., Yan, X., Sun, H., Feng, Y., & Liu, H. X. (2021). Intelligent driving intelligence test for autonomous vehicles with naturalistic and adversarial environment. Nature communications, 12(1), 1-14.
23. Sinha, A., O'Kelly, M., Tedrake, R., & Duchi, J. C. (2020). Neural bridge sampling for evaluating safety-critical autonomous systems. Advances in Neural Information Processing Systems, 33.
24. Li, L. et al. Parallel testing of vehicle intelligence via virtual-real interaction. Sci. Robot. 4, eaaw4106 (2019).
25. Li, L., Zheng, N., & Wang, F. Y. (2020). A theoretical foundation of intelligence testing and its application for intelligent vehicles. IEEE Transactions on Intelligent Transportation Systems, volume 22, issue 10, 6297-6306.
26. Simulation City: Introducing Waymo's most advanced simulation system yet for autonomous driving. https://blog.waymo.com/2021/06/SimulationCity.html
27. S. Kato, S. Tokunaga, Y. Maruyama, S. Maeda, M. Hirabayashi, Y. Kitsukawa, A. Monrroy, T. Ando, Y. Fujii, and T. Azumi, "Autoware on Board: Enabling Autonomous Vehicles with Embedded Systems," In Proceedings of the 9th ACM/IEEE International Conference on Cyber-Physical Systems (ICCPS2018), pp. 287-296, 2018.
28. Feng, S., Feng, Y., Yan, X., Shen, S., Xu, S., & Liu, H. X. (2020). Safety assessment of highly automated driving systems in test tracks: a new framework. Accident Analysis & Prevention, 144, 105664.
29. Lopez, P. A., Behrisch, M., Bieker-Walz, L., Erdmann, J., Flötteröd, Y. P., Hilbrich, R., . . . & Wießner, E. (2018, November). Microscopic traffic simulation using sumo. In 2018 21st International Conference on Intelligent Transportation Systems (ITSC) (pp. 2575-2582). IEEE.
30. D. Bezzina, J. Sayer, Safety pilot model deployment: Test conductor team report. (Report No. DOT HS 812 171). Washington, DC: National Highway Traffic Safety Administration (2014).
31. J. Sayer, D. LeBlanc, S. Bogard, D. Funkhouser, S. Bao, M. L. Buonarosa, A. Blankespoor, Integrated Vehicle-Based Safety Systems Field Operational Test: Final Program Report (No. FHWA-JPO-11-150;

UMTRI-2010-36). United States. Joint Program Office for Intelligent Transportation Systems (2011).
32. Arun, A., Haque, M. M., Bhaskar, A., Washington, S., & Sayed, T. (2021). A systematic mapping review of surrogate safety assessment using traffic conflict techniques. Accident Analysis & Prevention, 153, 106016.
33. Weng, B., Rao, S. J., Deosthale, E., Schnelle, S., & Barickman, F. (2020, June). Model predictive instantaneous safety metric for evaluation of automated driving systems. In 2020 IEEE Intelligent Vehicles Symposium (IV) (pp. 1899-1906). IEEE.
34. Junietz, P., Bonakdar, F., Klamann, B., & Winner, H. (2018, November). Criticality metric for the safety validation of automated driving using model predictive trajectory optimization. In 2018 21st International Conference on Intelligent Transportation Systems (ITSC) (pp. 60-65). IEEE.
35. Sun, H., Feng, S., Yan, X., & Liu, H. X. (2021). Corner Case Generation and Analysis for Safety Assessment of Autonomous Vehicles. Transportation Research Record. DOI: 10.1177/03611981211018697.
36. Schulman, J., Wolski, F., Dhariwal, P., Radford, A., & Klimov, O. (2017). Proximal policy optimization algorithms. https://arxiv.org/abs/1707.06347.
37. Owen, A. B. Monte Carlo Theory, Methods and Examples. https://statweb.stanford.edu/~owen/mc/ (2013).
38. Liang, E. et al. RLlib: Abstractions for Distributed Reinforcement Learning. (2018). https://arxiv.org/abs/1712.09381.
39. Treiber, M., Hennecke, A. & Helbing, D. Congested traffic states in empirical observations and microscopic simulations. Phys. Rev. E 62, 1805 (2000).
40. Kesting, A., Treiber, M. & Helbing, D. General lane-changing model MOBIL for car-following models. Transport. Res. Rec. 1999, 86-94 (2007).
41. Huang, G., Liu, Z., Van Der Maaten, L., & Weinberger, K. Q. (2017). Densely connected convolutional networks. In Proceedings of the IEEE conference on computer vision and pattern recognition (pp. 4700-4708).
42. Bengio, Y., Louradour, J., Collobert, R., & Weston, J. (2009, June). Curriculum learning. In Proceedings of the 26th annual international conference on machine learning (pp. 41-48).
43. Au, S. K., & Beck, J. L. (2003). Important sampling in high dimensions. Structural safety, 25(2), 139-163.
44. Silver, D., Singh, S., Precup, D., & Sutton, R. S. (2021). Reward is enough. Artificial Intelligence, 103535.
45. Yan, X., Feng, S., Sun, H., & Liu, H. X. (2021). Distributionally Consistent Simulation of Naturalistic Driving Environment for Autonomous Vehicle Testing. https://arxiv.org/abs/2101.02828.
46. Chang A X, Funkhouser T, Guibas L, Hanrahan P, Huang Q, Li Z, Savarese S, Savva M, Song S, Su H, Xiao J. Shapenet: An information-rich 3d model repository. arXiv preprint arXiv:1512.03012. 2015 Dec. 9.
47. Darweesh, H., Takeuchi, E., Takeda, K., Ninomiya, Y., Sujiwo, A., Morales, L. Y., . . . & Kato, S. (2017). Open source integrated planner for autonomous navigation in highly dynamic environments. Journal of Robotics and Mechatronics, 29(4), 668-684.

The invention claimed is:
1. A method of safety testing a host autonomous vehicle (AV), comprising the steps of:
generating a trained machine learning (ML) agent by: (i) obtaining a testing state model having non-safety-critical states and safety-critical states, (ii) editing the testing state model to obtain an edited testing state model that omits data concerning the non-safety-critical states, and (iii) training a ML agent using the edited state testing model so as to generate the trained ML agent; and
testing the host AV in an environment that includes one or more background vehicles configured to operate according to the trained ML agent.
2. The method of claim 1, further comprising a step of configuring the one or more background vehicles to operate according to the trained ML agent, wherein the configuring step includes storing data representing the trained ML agent in computer-readable memory.
3. The method of claim 1, wherein the trained ML agent is a deep reinforcement learning (DRL) agent, and wherein the trained ML agent employs a neural network.
4. The method of claim 3, wherein the trained ML agent is a dense DRL (D2RL) agent.
5. The method of claim 4, wherein the testing state model is or is based on a Markov decision process (MDP).
6. The method of claim 5, wherein a D2RL approach is used to densify safety-critical data used to train the ML agent.
7. The method of claim 5, wherein the editing sub-step includes removing the non-safety-critical states and reconnecting the safety-critical states.
8. The method of claim 1, wherein the environment in which the host AV is tested is a real environment having one or more roadways on which the host AV travels during testing, and wherein the one or more background vehicles are virtual or simulated vehicles.
9. The method of claim 8, wherein the testing step includes carrying out a simulation that is synchronized with the host AV and the environment in which the host AV is tested, and wherein the simulation includes at least one of the one or more background vehicles as a virtual background vehicle.
10. The method of claim 1, wherein the method is carried out by an augmented reality (AR) autonomous vehicle (AV) testing system.
11. An autonomous vehicle (AV) testing system, comprising:
at least one electronic processor and memory accessible by the at least one electronic processor, wherein the memory stores computer instructions;
wherein the AV testing system is configured so that, when the at least one electronic processor executes the computer instructions, the AV testing system:
generates a trained machine learning (ML) agent by: (i) obtaining a testing state model having non-safety-critical states and safety-critical states, (ii) editing the testing state model to obtain an edited testing state model that omits data concerning the non-safety-critical states, and (iii) training a ML agent using the edited state testing model so as to generate the trained ML agent; and
tests the host AV in an environment that includes one or more background vehicles configured to operate according to the trained ML agent.
12. The AV testing system of claim 11, wherein the AV testing system is configured so that, when the at least one electronic processor executes the computer instructions, the AV testing system: configures the one or more background vehicles to operate according to the trained ML agent, wherein the configuring step includes storing data representing the trained ML agent in computer-readable memory.

13. The AV testing system of claim 11, wherein the trained ML agent is a deep reinforcement learning (DRL) agent, and wherein the trained ML agent employs a neural network.

14. The AV testing system of claim 13, wherein the trained ML agent is a dense DRL (D2RL) agent.

15. The AV testing system of claim 14, wherein the testing state model is or is based on a Markov decision process (MDP).

16. The AV testing system of claim 15, wherein a D2RL approach is used to densify safety-critical data used to train the ML agent.

17. The AV testing system of claim 15, wherein the editing sub-step includes removing the non-safety-critical states and reconnecting the safety-critical states.

18. The AV testing system of claim 11, wherein the environment in which the host AV is tested is a real environment having one or more roadways on which the host AV travels during testing, and wherein the one or more background vehicles are virtual or simulated vehicles.

19. The AV testing system of claim 18, wherein the testing step includes carrying out a simulation that is synchronized with the host AV and the environment in which the host AV is tested, and wherein the simulation includes at least one of the one or more background vehicles as a virtual background vehicle.

20. A method of safety testing a host autonomous vehicle (AV), comprising the steps of:
- generating a trained dense deep reinforcement learning (D2RL) agent by (i) obtaining a testing state model having non-safety-critical states and safety-critical states, (ii) editing the testing state model to omit at least one non-safety-critical state and reconnect at least two safety-critical states, and (iii) training a D2RL agent using the edited state testing model so as to generate the trained D2RL agent;
- configuring one or more background vehicles to operate according to the trained D2RL agent; and
- after configuring one or more background vehicles to operate according to the trained D2RL agent, testing the AV in an environment that includes the one or more background vehicles.

* * * * *